US012107335B2

(12) United States Patent
Li et al.

(10) Patent No.: US 12,107,335 B2
(45) Date of Patent: Oct. 1, 2024

(54) ELECTRONIC DEVICES WITH DISTRIBUTED SLOT ANTENNA STRUCTURES

(71) Applicant: Apple Inc., Cupertino, CA (US)

(72) Inventors: Aobo Li, Saratoga, CA (US); Erdinc Irci, Sunnyvale, CA (US); Carlo Di Nallo, Belmont, CA (US); Enrique Ayala Vazquez, Watsonville, CA (US); Haozhan Tian, San Jose, CA (US); Hongfei Hu, Cupertino, CA (US); Liang Han, Sunnyvale, CA (US); Ming Chen, Cupertino, CA (US); Ming-Ju Tsai, Sunnyvale, CA (US); Salih Yarga, Sunnyvale, CA (US); Tiejun Yu, Fremont, CA (US); Victor C Lee, Santa Clara, CA (US); Xu Han, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 17/728,737

(22) Filed: Apr. 25, 2022

(65) Prior Publication Data
US 2023/0083466 A1 Mar. 16, 2023

Related U.S. Application Data

(60) Provisional application No. 63/243,547, filed on Sep. 13, 2021.

(51) Int. Cl.
*H01Q 21/06* (2006.01)
*H04B 1/00* (2006.01)
*H04M 1/02* (2006.01)

(52) U.S. Cl.
CPC .......... *H01Q 21/064* (2013.01); *H01Q 21/06* (2013.01); *H04B 1/00* (2013.01); *H04B 1/0064* (2013.01); *H04M 1/0266* (2013.01)

(58) Field of Classification Search
CPC ... H01Q 21/064; H01Q 21/06; H04M 1/0266; H04B 1/0064; H04B 1/00
(Continued)

(56) References Cited

U.S. PATENT DOCUMENTS 10,484,958 B2 11/2019 Sayem et al.
10,629,982 B2 * 4/2020 Kim .......................... H01Q 5/10
(Continued)

*Primary Examiner* — Hai V Tran
(74) *Attorney, Agent, or Firm* — Treyz Law Group, P.C.; Michael H. Lyons

(57) ABSTRACT

An electronic device may have peripheral conductive housing structures, a display frame, a support plate, a logic board, and an antenna. The antenna may have a resonating element that includes a first slot between the logic board and a segment of the peripheral conductive housing structures, a second slot between the display frame and the segment, and optionally a third slot between the support plate and the segment. The slots may be at least partially overlapping, may have respective lengths, may be located at respective distances from a cover layer for the display, and may collectively receive radio-frequency signals in a frequency band such as the L5 GPS band. Switching circuitry and filter circuitry may be coupled to the antenna feed and/or to the antenna feed (s) of one or more adjacent antennas in the electronic device to help to isolate the antennas from each other.

20 Claims, 14 Drawing Sheets

(58) Field of Classification Search
USPC .......................................................... 343/720
See application file for complete search history.

(56) References Cited

U.S. PATENT DOCUMENTS

| | | |
|---|---|---|
| 10,700,417 B1 | 6/2020 | Kwon et al. |
| 10,833,410 B2 | 11/2020 | Ayala Vazquez et al. |
| 10,854,953 B2 | 12/2020 | Romano et al. |
| 10,908,654 B2 | 2/2021 | Oster et al. |
| 10,992,029 B2 | 4/2021 | Wei et al. |
| 11,089,562 B2 | 8/2021 | Pascolini |
| 11,322,840 B2 | 5/2022 | Wang et al. |
| 2012/0178382 A1* | 7/2012 | Merz .................... H01Q 13/103 343/702 |
| 2018/0261921 A1* | 9/2018 | Ha ........................... H01Q 9/42 |
| 2020/0127384 A1* | 4/2020 | Thakur ................ H01Q 1/2266 |
| 2020/0153086 A1* | 5/2020 | Park ..................... H01Q 9/0407 |
| 2021/0066781 A1 | 3/2021 | Oh et al. |
| 2021/0126340 A1 | 4/2021 | Niakan et al. |
| 2021/0280971 A1* | 9/2021 | Kim ....................... H01Q 21/28 |
| 2021/0280981 A1* | 9/2021 | Kim ....................... H01Q 21/28 |
| 2022/0085488 A1 | 3/2022 | Irci et al. |
| 2022/0102852 A1 | 3/2022 | Irci et al. |

* cited by examiner

ELECTRONIC DEVICES WITH DISTRIBUTED SLOT ANTENNA STRUCTURES

This application claims the benefit of U.S. Provisional Patent Application No. 63/243,547, filed Sep. 13, 2021, which is hereby incorporated by reference herein in its entirety.

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

SUMMARY

An electronic device may be provided with wireless circuitry and a housing having peripheral conductive housing structures. A display may be mounted to the peripheral conductive housing structures. The display may include a display module with a conductive display frame. A rear housing wall may be mounted to the peripheral conductive housing structures opposite the display. The rear housing wall may include a conductive support plate. A logic board having conductive structures may be mounted within the housing.

The electronic device may include an antenna having a multi-slot distributed slot antenna resonating element. The antenna may include a first slot between the conductive structures and a segment of the peripheral conductive housing structures. An antenna feed may be coupled across the first slot. The antenna may include a second slot between the conductive display frame and the segment. The antenna may include a third slot between the conductive support plate and the peripheral conductive housing structures. The first, second, and third slots may be at least partially overlapping, may have respective lengths, and may be located at respective distances from a cover layer for the display. The first, second, and third slots may collectively receive radio-frequency signals in a frequency band such as the L5 GPS band. If desired, the third slot may be omitted and the first and second slots may collectively receive radio-frequency signals in the L5 GPS band. Switching circuitry and filter circuitry may be coupled to the antenna feed and/or to the antenna feed (s) of one or more adjacent antennas in the electronic device to help to isolate the antennas from each other.

DETAILED DESCRIPTION

Figure 1:
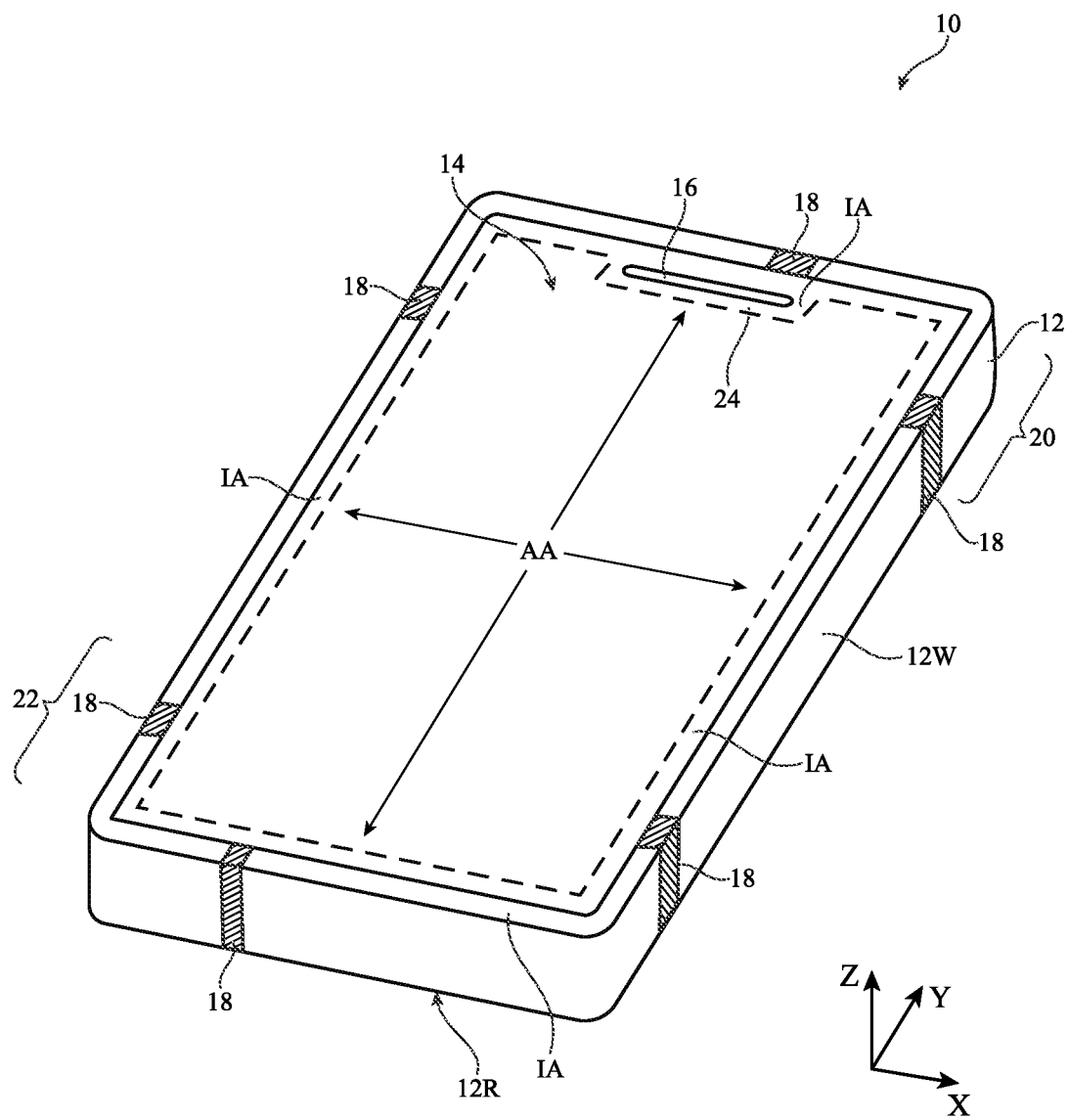
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
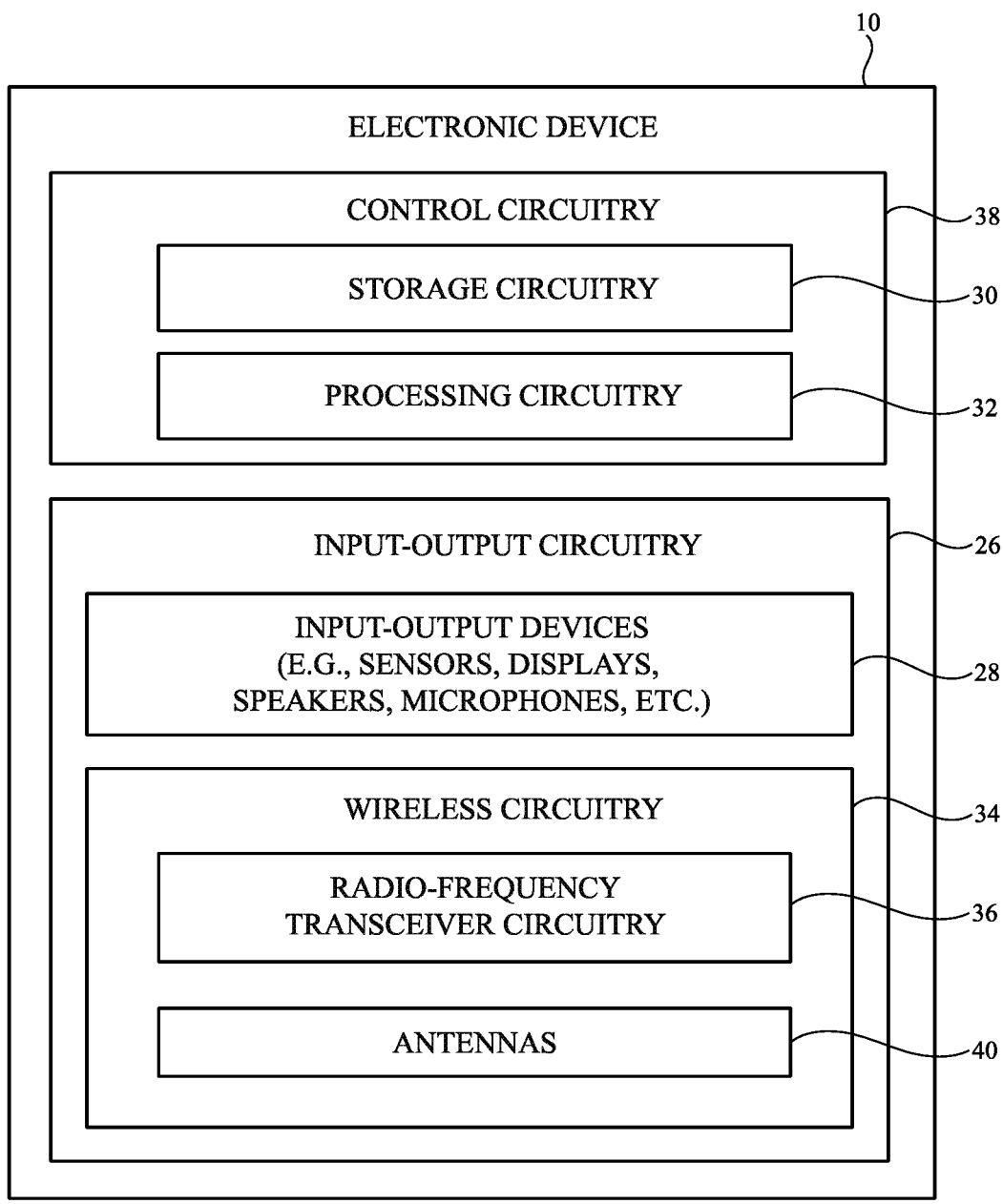
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
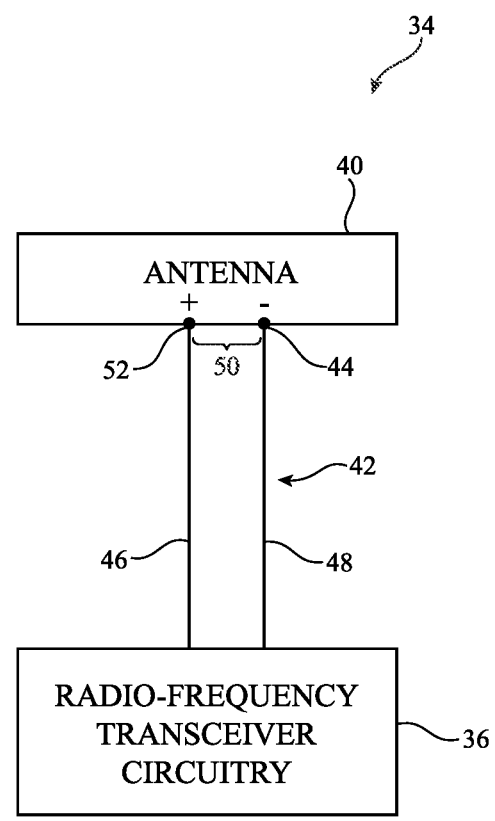
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include an antenna resonating (radiating) element and an antenna ground. Antenna feed 50 may include a positive antenna feed terminal 52 coupled to the antenna resonating element and a ground antenna feed terminal 44 coupled to the antenna ground.

Radio-frequency transceiver circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
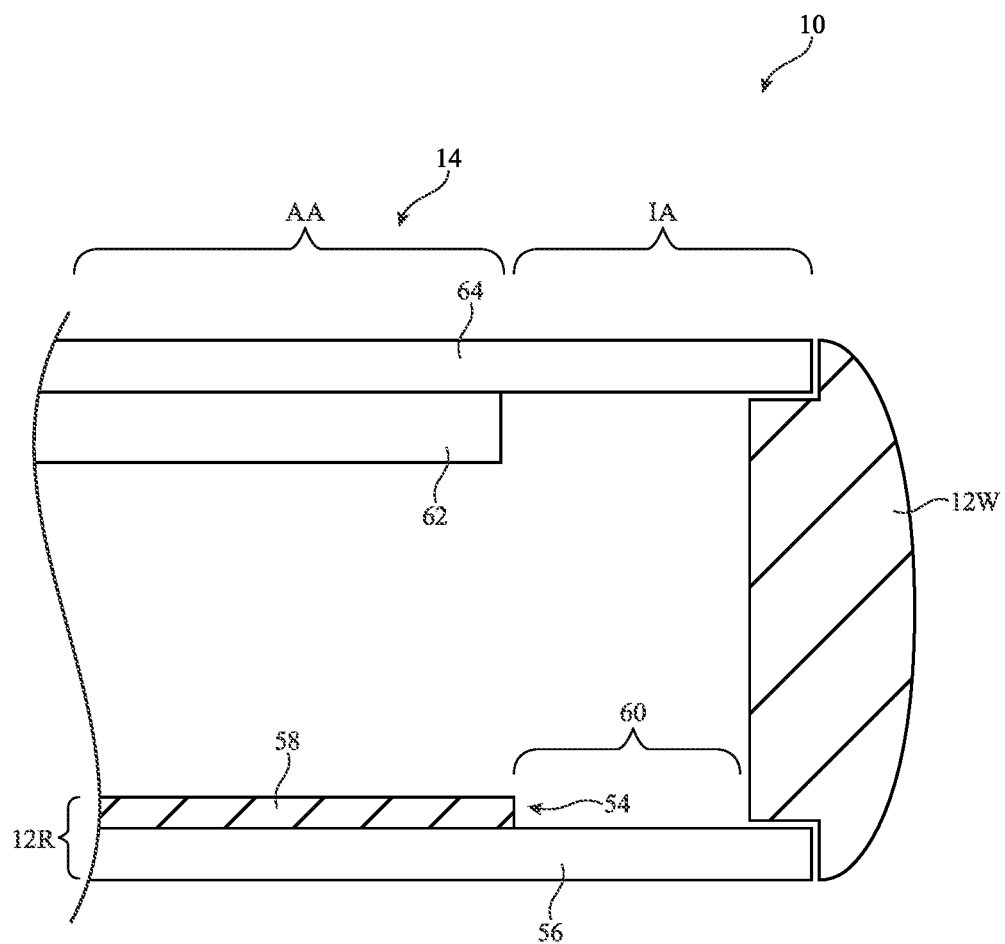
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive support plate 58 may, if desired, provide structural and mechanical support for device 10.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

Conductive housing structures such as conductive support plate 58 and/or peripheral conductive housing structures 12W (e.g., the portion of peripheral conductive housing structures 12W opposite conductive support plate 58 at slot 60) may be used to form antenna structures for one or more of the antennas 40 in device 10. For example, conductive support plate 58 may be used to form the ground plane for one or more of the antennas 40 in device 10 and/or to form one or more edges of slot antenna resonating elements (e.g., slot antenna resonating elements formed from slot 60) for the antennas 40 in device 10. Peripheral conductive housing structures 12W may form an antenna resonating element arm (e.g., an inverted-F antenna resonating element arm) for one or more of the antennas 40 in device 10. If desired, a portion of peripheral conductive housing structures 12W and/or a portion of conductive support plate 58 (e.g., at edge 54 of slot 60) may form part of a conductive loop path used to form a loop antenna resonating element for antenna 40 that conveys radio-frequency signals in an NFC band.

Figure 5:
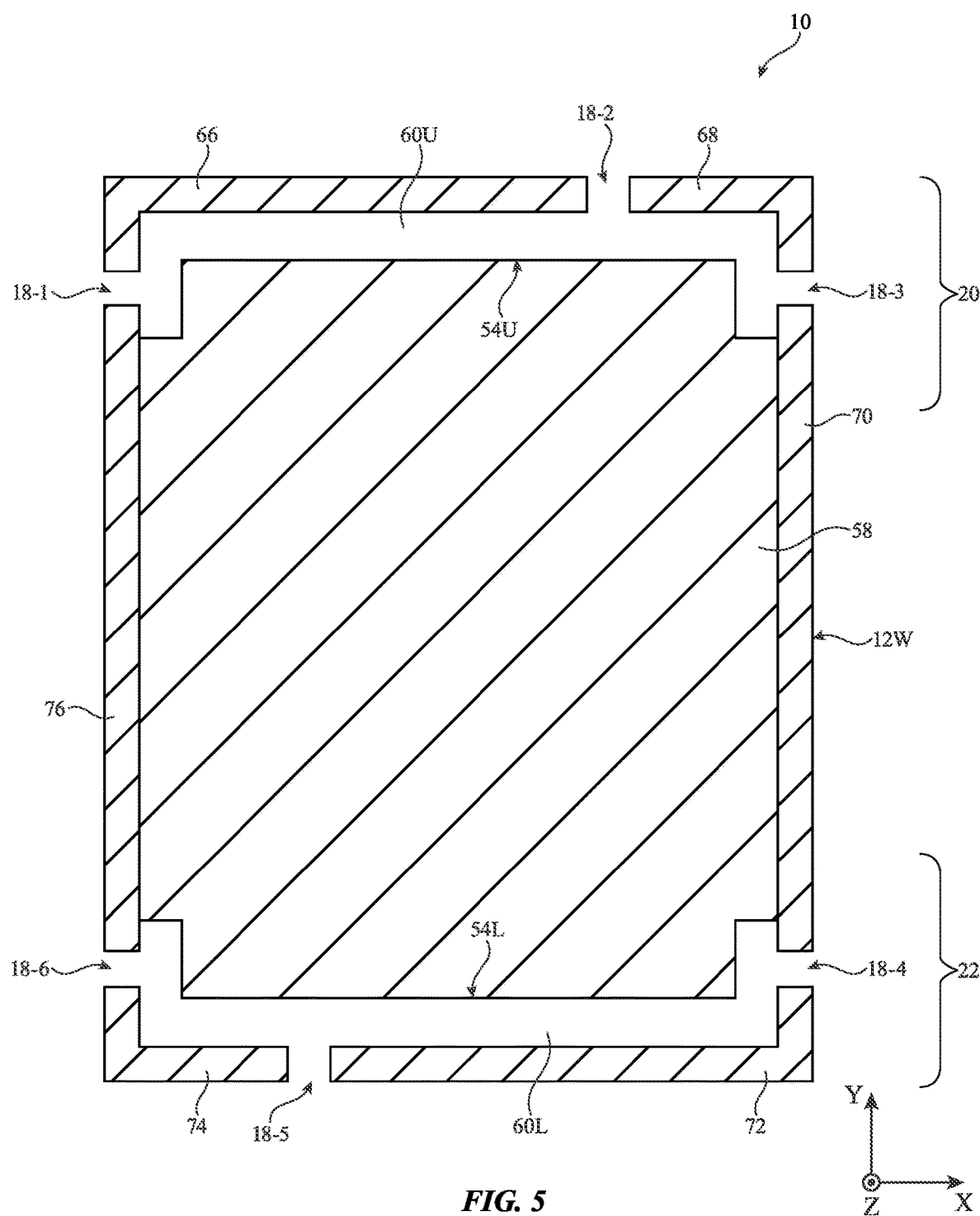
FIG. 5 is a top interior view of an illustrative electronic device having slots and segments of peripheral conductive housing structures that are used in forming multiple antennas for the electronic device in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how device 10 may include multiple slots 60 and may include multiple dielectric gaps that divide the peripheral conductive housing structures into segments. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10, a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, a third gap 18-3, a fourth gap 18-4, a fifth gap 18-5, and a sixth gap 18-6. Gaps 18-1, 18-2, 18-3, 18-4, 18-5, and 18-6 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 76 of peripheral conductive housing structures 12W from segment 66 of peripheral conductive housing structures 12W. Gap 18-2 may divide the second conductive sidewall to separate segment 66 from segment 68 of peripheral conductive housing structures 12W. Gap 18-3 may divide the third conductive sidewall to separate segment 68 from segment 70 of peripheral conductive housing structures 12W. Gap 18-4 may divide the third conductive sidewall to separate segment 70 from segment 72 of peripheral conductive housing structures 12W. Gap 18-5 may divide the fourth conductive sidewall to separate segment 72 from segment 74 of peripheral conductive housing structures 12W. Gap 18-6 may divide the first conductive sidewall to separate segment 74 from segment 76.

In this example, segment 66 forms the top-left corner of device 10 (e.g., segment 66 may have a bend at the corner) and is formed from the first and second conductive sidewalls of peripheral conductive housing structures 12W (e.g., in upper region 20 of device 10). Segment 68 forms the top-right corner of device 10 (e.g., segment 68 may have a bend at the corner) and is formed from the second and third conductive sidewalls of peripheral conductive housing structures 12W (e.g., in upper region 20 of device 10). Segment 72 forms the bottom-right corner of device 10 and is formed from the third and fourth conductive sidewalls of peripheral conductive housing structures 12W (e.g., in lower region 22 of device 10). Segment 74 forms the bottom-left corner of device 10 and is formed from the fourth and first conductive sidewalls of peripheral conductive housing structures 12W (e.g., in lower region 22 of device 10).

Conductive support plate 58 may extend between opposing sidewalls of peripheral conductive housing structures 12W. For example, conductive support plate 58 may extend from segment 76 to segment 70 of peripheral conductive housing structures 12W (e.g., across the width of device 10, parallel to the X-axis). Conductive support plate 58 may be welded or otherwise affixed to segments 76 and 70. In another suitable arrangement, conductive support plate 58, segment 76, and segment 70 may be formed from a single, integral (continuous) piece of machined metal (e.g., in a unibody configuration).

As shown in FIG. 5, device 10 may include multiple slots 60 (FIG. 4). For example, device 10 may include an upper slot such as slot 60U in upper region 20 and a lower slot such as slot 60L in lower region 22. The lower edge of slot 60U may be defined by upper edge 54U of conductive support plate 58 (e.g., an edge of conductive support plate 58 such as edge 54 of FIG. 4). The upper edge of slot 60U may be defined by segments 66 and 68 (e.g., slot 60U may be interposed between conductive support plate 58 and segments 66 and 68 of peripheral conductive housing structures 12W). The upper edge of slot 60L may be defined by lower edge 54L of conductive support plate 58 (e.g., an edge of conductive support plate 58 such as edge 54 of FIG. 4). The lower edge of slot 60L may be defined by segments 74 and 72 (e.g., slot 60L may be interposed between conductive support plate 58 and segments 74 and 72 of peripheral conductive housing structures 12W).

Slot 60U may have an elongated shape extending from a first end at gap 18-2 to an opposing second end at gap 18-3 (e.g., slot 60U may span the width of device 10). Similarly, slot 60L may have an elongated shape extending from a first end at gap 18-6 to an opposing second end at gap 18-4 (e.g., slot 60L may span the width of device 10). Slots 60U and 60L may be filled with air, plastic, glass, sapphire, epoxy, ceramic, or other dielectric material. Slot 60U may be continuous with gaps 18-1, 18-2, and 18-3 in peripheral conductive housing structures 12W if desired (e.g., a single piece of dielectric material may be used to fill both slot 60U and gaps 18-1, 18-2, and 18-3). Similarly, slot 60L may be continuous with gaps 18-6, 18-5, and 18-4 if desired (e.g., a single piece of dielectric material may be used to fill both slot 60L and gaps 18-6, 18-5, and 18-4).

Conductive support plate 58, segment 66, segment 68, and portions of slot 60U may be used in forming multiple antennas 40 in upper region 20 of device 10 (sometimes referred to herein as upper antennas). Conductive support plate 58, portions of slot 60L, segment 74, and segment 72 may be used in forming multiple antennas 40 in lower region 22 of device 10 (sometimes referred to herein as lower antennas). If desired, one or more phased antenna arrays for conveying millimeter and centimeter wave signals may at least partially overlap slot 60U, conductive support plate 58, and/or slot 60L (not shown in FIG. 5 for the sake of clarity). The phased antenna arrays may radiate through display cover layer 64 of FIG. 4, through dielectric cover layer 56 of FIG. 4, and/or through one or more apertures in peripheral conductive housing structures 12W.

Figure 6:
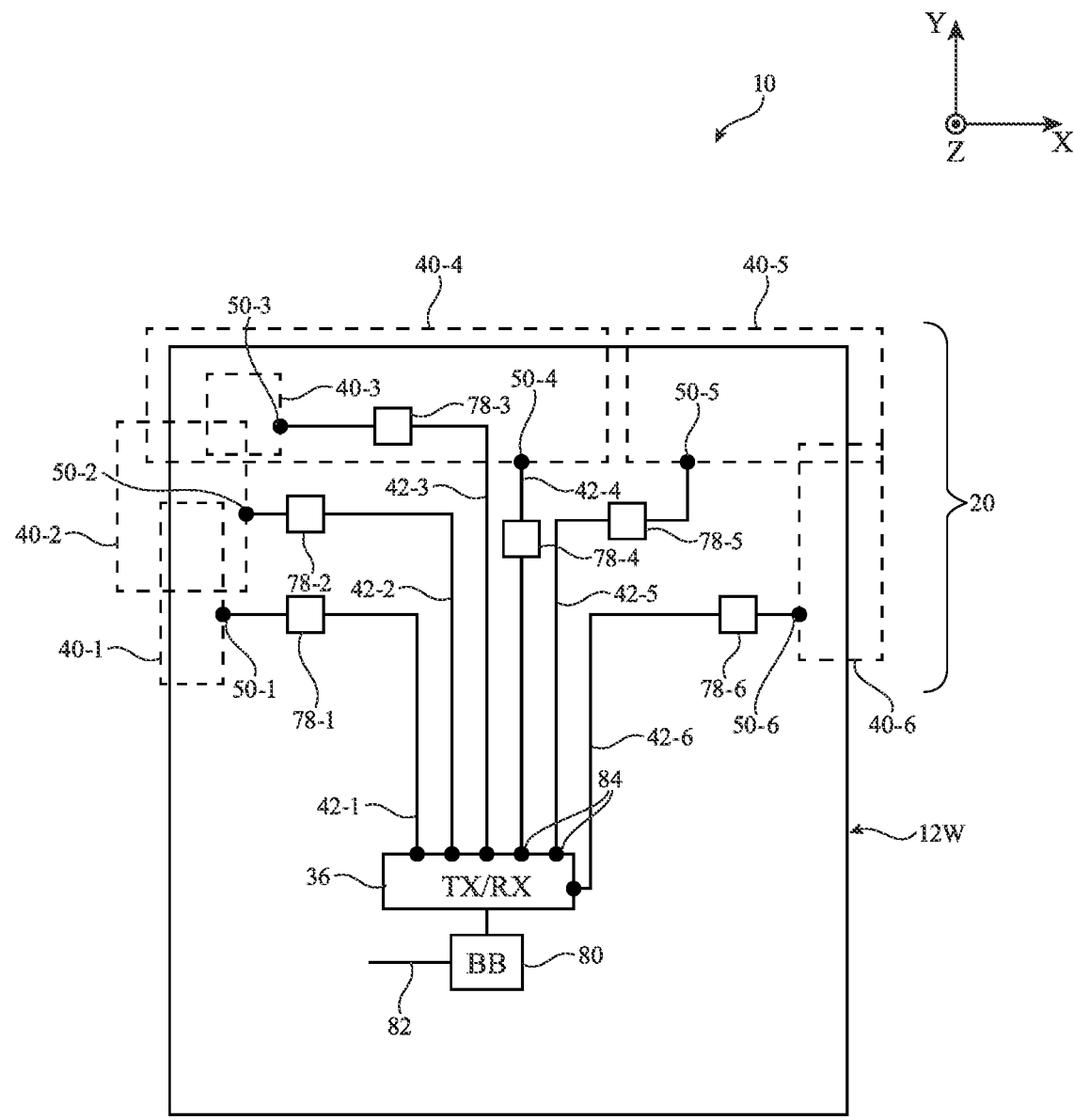
FIG. 6 is a diagram showing how an illustrative electronic device may include multiple antennas at an end of the electronic device accordance with some embodiments.

FIG. 6 is schematic diagram showing how device 10 may include multiple antennas 40 in upper region 20. As shown in FIG. 6, device 10 may include at least six antennas 40 in upper region 20 such as antennas 40-1, 40-2, 40-3, 40-4, 40-6, and 40-6. This is merely illustrative and, if desired, device 10 may include fewer than six antennas 40 in upper region 20 (e.g., one of antennas 40-1 and 40-6 may be omitted). Device 10 may also include antennas in lower region 22 (FIGS. 1 and 5). Each antenna may be fed by a corresponding antenna feed 50 (e.g., antenna 40-1 have antenna feed 50-1, antenna 40-2 may have antenna feed 50-2, antenna 40-3 may have antenna feed 50-3, antenna 40-4 may have antenna feed 50-4, antenna 40-5 may have antenna feed 50-5, antenna 40-6 may have antenna feed 50-6, etc.). If desired, an antenna feed 50 may be shared by multiple antennas 40. This example is merely illustrative and, in general, device 10 may include any desired number of antennas 40.

Antennas 40-1, 40-2, 40-3, and 40-4 may be located in the top-left corner of device 10. Antennas 40-5 and 40-6 may be located in the top-right corner of device 10. The volume of antenna 40-4 may at least partially overlap the volume of antennas 40-3, 49-1, and/or 40-2 if desired. The volume of antenna 40-3 may at least partially overlap the volume of antennas 40-2 and/or 40-4 if desired. The volume of antenna 40-5 may at least partially overlap the volume of antenna 40-6 if desired. The volume of antenna 40-1 may at least partially overlap the volume of antennas 40-2, 40-3, and/or 40-4 if desired. Antennas 40-1, 40-2, 40-4, 40-5, and 40-6 may each have antenna resonating elements that are formed at least in part from portions of peripheral conductive housing structures 12W and/or conductive support plate 58 (FIG. 5).

As shown in FIG. 6, the wireless circuitry in device 10 may include one or more input-output ports such as port 82 for interfacing with digital data circuits in storage and processing circuitry (e.g., control circuitry 38 of FIG. 2).

Wireless circuitry 34 may include baseband circuitry such as baseband (BB) processor 80 coupled between port 82 and radio-frequency transceiver (TX/RX) circuitry 36. Port 82 may receive digital data (e.g., uplink data) from the control circuitry that is to be transmitted by radio-frequency transceiver circuitry 36. Incoming data (e.g., downlink data) that has been received by radio-frequency transceiver circuitry 36 and baseband processor 80 may be supplied to the control circuitry via port 82.

Radio-frequency transceiver circuitry 36 may include multiple transceiver ports 84 that are each coupled to a respective transmission line path 42 (e.g., a first transmission line path 42-1, a second transmission line path 42-2, a third transmission line path 42-3, etc.). Transmission line path 42-1 may couple a first transceiver port 84 of radio-frequency transceiver circuitry 36 to the antenna feed 50-1 of antenna 40-1. Transmission line path 42-2 may couple a second transceiver port 84 to the antenna feed 50-2 of antenna 40-2. Similarly, transmission line paths 42-3, 42-4, 42-5, and 42-6 may each couple a respective transceiver port 84 to antenna feed 50-3 of antenna 40-3, antenna feed 50-4 of antenna 40-4, antenna feed 50-5 of antenna 40-5, and antenna feed 50-6 of antenna 40-6, respectively.

Radio-frequency front-end circuits 78 may be interposed on each transmission line path 42 (e.g., a first front-end circuit 78-1 may be interposed on transmission line path 42-1, a second front-end circuit 78-2 may be interposed on transmission line path 42-2, a third front-end circuit 78-3 may be interposed on transmission line path 42-3, etc.). Front-end circuits 78 may each include switching circuitry, filter circuitry (e.g., duplexer and/or diplexer circuitry, notch filter circuitry, low pass filter circuitry, high pass filter circuitry, bandpass filter circuitry, etc.), impedance matching circuitry for matching the impedance of transmission line path 42 to the corresponding antenna 40, networks of active and/or passive components such as antenna tuning components (e.g., capacitors, resistors, inductors, switches, etc.), radio-frequency coupler circuitry for gathering antenna impedance measurements, or any other desired radio-frequency circuitry. If desired, front-end circuits 78 may include switching circuitry that is configured to selectively couple antennas 40-1 through 40-6 to different respective transceiver ports 84 (e.g., so that each antenna can handle communications for different transceiver ports 84 over time based on the state of the switching circuits in front-end circuits 78). If desired, front-end circuits 78 may include filtering circuitry (e.g., duplexers and/or diplexers) that allow the corresponding antenna to transmit and receive radio-frequency signals in one or more frequency bands at the same time (e.g., using a frequency domain duplexing (FDD) scheme). In general, any desired combination of antennas may transmit and/or receive radio-frequency signals at a given time.

Amplifier circuitry such as one or more power amplifiers may be interposed on transmission line paths 42 (e.g., within front-end circuits 78 or elsewhere) and/or may be formed within radio-frequency transceiver circuitry 36 for amplifying radio-frequency signals output by radio-frequency transceiver circuitry 36 prior to transmission over antennas 40. Amplifier circuitry such as one or more low noise amplifiers may be interposed on transmission line paths 42 (e.g., within front-end circuits 78 or elsewhere) and/or may be formed within radio-frequency transceiver circuitry 36 for amplifying radio-frequency signals received by antennas 40 prior to conveying the received signals to radio-frequency transceiver circuitry 36. In the example of FIG. 6, separate front-end circuits 78 are interposed on each transmission line path 42. This is merely illustrative. If desired, two or more transmission line paths 42 may share the same front-end circuit 78.

Radio-frequency transceiver circuitry 36 may, for example, include circuitry for converting baseband signals received from baseband processor 80 into corresponding radio-frequency signals. For example, radio-frequency transceiver circuitry 36 may include mixer circuitry for up-converting the baseband signals to radio-frequencies prior to transmission over antennas 40. Radio-frequency transceiver circuitry 36 may include digital to analog converter (DAC) and/or analog to digital converter (ADC) circuitry for converting signals between digital and analog domains. Radio-frequency transceiver circuitry 36 may include circuitry for converting radio-frequency signals received from antennas 40 over transmission line paths 42 into corresponding baseband signals. For example, radio-frequency transceiver circuitry 36 may include mixer circuitry for down-converting the radio-frequency signals to baseband frequencies prior to conveying the baseband signals to baseband processor 80. Baseband processor 80, front-end circuits 78, and/or radio-frequency transceiver circuitry 36 may be formed on the same substrate, integrated circuit, integrated circuit package, or module, or two or more of these components may be formed on separate substrates, integrated circuits, integrated circuit packages, or modules.

If desired, each of the antennas 40-1 through 40-6 may handle radio-frequency communications in one or more frequency bands. In some implementations that are described herein as an example, antenna 40-1 covers the L5 GPS band, antenna 40-2 covers the 5 GHz WLAN band and one or more UWB bands (e.g., a 6.5 GHz UWB band and a 8.0 GHz UWB band), antenna 40-3 covers a cellular UHB, antenna 40-4 covers the cellular LB, LMB, MB, HB, one or more satellite communications bands (e.g., for uplink and/or downlink), and the L1 GPS band, antenna 40-5 covers the cellular MB, HB, and UHB, the 2.4 GHz WLAN/WPAN band, and one or more satellite communications bands (e.g., for uplink), and antenna 40-6 covers the L5 GPS band. Portions of antennas 40-4 and 40-5 may also be used to form a loop antenna resonating element for an NFC antenna that radiates in an NFC band. This example is merely illustrative. In general, each of the antennas may cover any desired combinations of communications bands. In some implementations, antenna 40-1 may be omitted and antenna 40-6 may cover the L5 GPS band (e.g., device 10 may include antennas 40-2 through 40-6). In other implementations, antenna 40-6 may be omitted and antenna 40-1 may cover the L5 GPS band. If desired, a flexible printed circuit including three additional antennas (e.g., a triplet of antennas) for conveying UWB signals and/or including one or more antennas for conveying millimeter/centimeter wave signals through the rear housing wall of device 10 may be mounted in the upper-left corner of device 10 (e.g., overlapping antennas 40-1, 40-2, 40-3, and/or 40-4).

To increase the overall data throughput of wireless circuitry 34 (FIG. 2), multiple antennas may be operated using a multiple-input and multiple-output (MIMO) scheme. When operating using a MIMO scheme, two or more antennas on device 10 may be used to concurrently convey multiple independent streams of wireless data at the same frequencies. This may significantly increase the overall data throughput between device 10 and the external communications equipment relative to scenarios where only a single antenna is used. In general, the greater the number of antennas that are used for conveying wireless data under the MIMO scheme, the greater the overall throughput of wireless circuitry 34.

If desired, the wireless circuitry may perform so-called two-stream (2X) MIMO operations (sometimes referred to herein as 2X MIMO communications or communications using a 2X MIMO scheme) in which two antennas 40 are used to convey two independent streams of radio-frequency signals at the same frequency. The frequency bands that are covered by two or more antennas 40 may be used to perform 2X MIMO operations in those frequency bands, if desired. The wireless circuitry may also perform so-called four-stream (4X) MIMO operations (sometimes referred to herein as 4X MIMO communications or communications using a 4X MIMO scheme) in which four antennas 40 are used to convey four independent streams of radio-frequency signals at the same frequency. The frequency bands that are covered by four or more antennas 40 may be used to perform 4X MIMO operations in those frequency bands, if desired. Performing 4X MIMO operations may support higher overall data throughput than 2X MIMO operations because 4X MIMO operations involve four independent wireless data streams whereas 2X MIMO operations involve only two independent wireless data streams. Carrier aggregation schemes may also be used in performing wireless operations with antennas 40-1 through 40-6 (e.g., where different frequencies are used to concurrently convey radio-frequency signals with multiple base stations sometimes referred to as a primary cell and a secondary cell).

Figure 7:
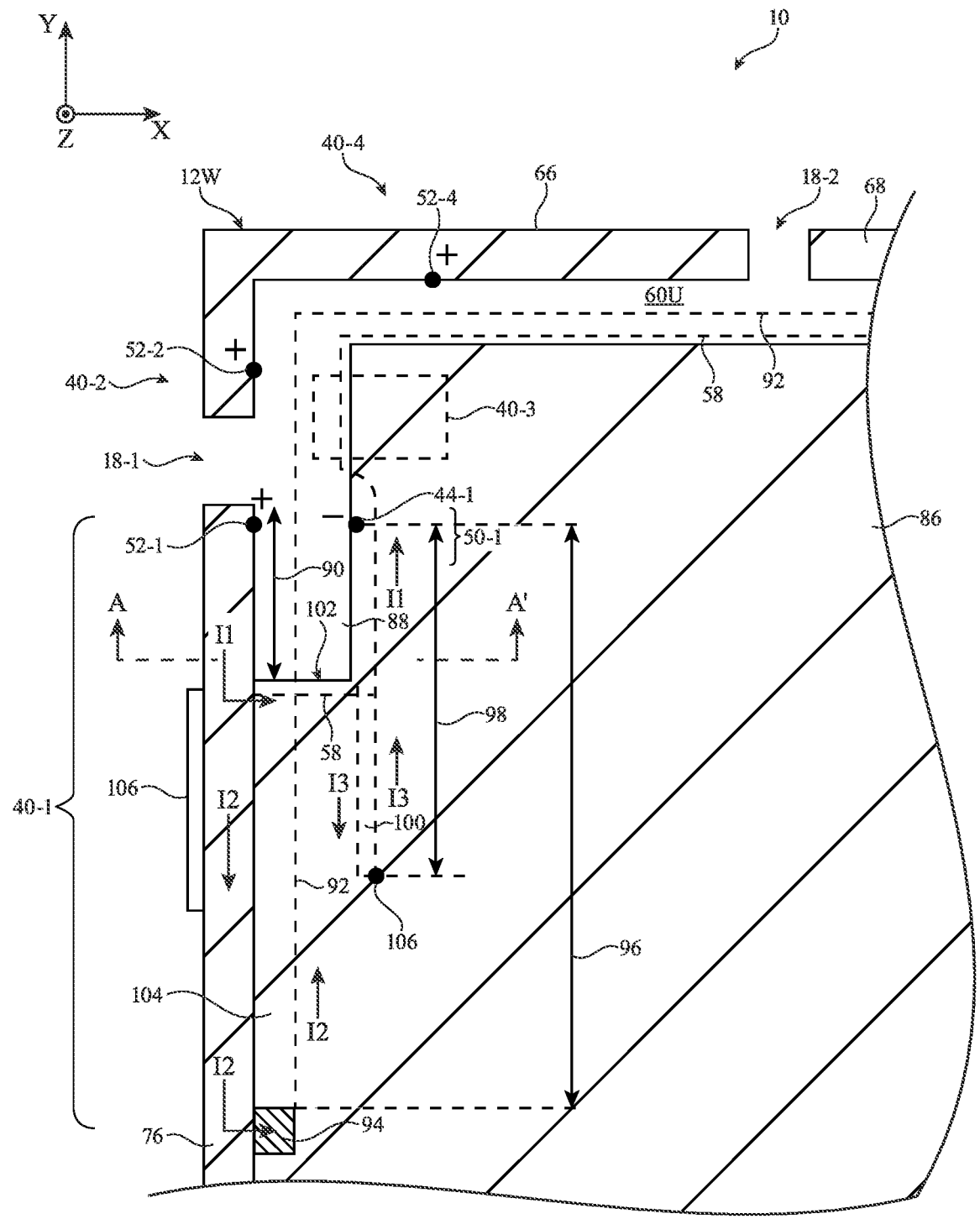
FIG. 7 is a top interior view of a first corner of an illustrative electronic device having multiple antennas including a distributed slot antenna in accordance with some embodiments.

If care is not taken, due to close physical proximity, it can be difficult for antennas 40-1, 40-2, 40-3, and 40-4 in the upper-left corner of device 10 to each convey radio-frequency signals in corresponding frequency bands with satisfactory antenna efficiency. FIG. 7 is a top interior view showing how antennas 40-1, 40-2, 40-3, and 40-4 may be formed within device 10 in a manner such that the antennas each cover the corresponding frequency bands with satisfactory antenna efficiency.

As shown in FIG. 7, conductive support plate 58 may be coupled (connected) to segment 76 of peripheral conductive housing structures 12W. Conductive structures 86 may vertically overlap (overly) conductive support plate 58 (e.g., in the Z direction). Conductive structures 86 may also be coupled (connected) to segment 76 of peripheral conductive housing structures 12W. Conductive structures 86 may be conductive structures on a main logic board for device 10, as an example (e.g., ground traces on the main logic board, conductive housings or other conductive portions of components mounted to the main logic board, etc.). Conductive structures 86 may therefore sometimes be referred to herein as conductive logic board structures 86 or simply as main logic board 86.

Conductive portions of the display for device 10 such as conductive display frame 92 may vertically overlap (overly) conductive structures 86 and conductive support plate 58 (e.g., in the Z direction). Conductive display frame 92 may, for example, provide mechanical/structural support and/or grounding for display module 62 of FIG. 4 (e.g., conductive display frame 92 may form a part of display module 62). Conductive display frame 92 may include other conductive portions of the display module and may therefore sometimes be referred to herein as conductive display structures 92. Conductive display frame 92 may overlap active area AA of display 14 (FIG. 4). The lateral edges of conductive display frame 92 may overlap slot 60U and may be separated from peripheral conductive housing structures 12W by inactive area IA of display 14 (FIG. 4).

Conductive interconnect structures such as conductive interconnect structure 94 may couple the edge of conductive display frame 92 to peripheral conductive housing structures 12W at one or more points (e.g., at segment 76). Conductive interconnect structure 94 may include conductive adhesive, conductive springs, welds, solder, a conductive clip, a conductive snap, conductive foam, a conductive screw, a conductive screw boss, a conductive pin, and/or any other desired conductive interconnect structures. Conductive interconnect structure 94 may serve to secure, attach, affix, or mount display 14 to peripheral conductive housing structures 12W and may, if desired, ground conductive display frame 92 to peripheral conductive housing structures 12W. Conductive interconnect structures such as conductive interconnect structure 94 and/or other grounding structures may electrically couple conductive structures 86, conductive support plate 58, and conductive display frame 92 together (e.g., to hold conductive structures 86, conductive support plate 58, and conductive display frame 92 at a common ground or reference potential). Conductive structures 86, conductive support plate 58, and conductive display frame 92 may, for example, form the antenna ground for antennas 40-1, 40-2, 40-3, and 40-4.

Conductive structures 86 and conductive support plate 58 may be laterally separated from segments 66 and 68 of peripheral conductive housing structures 12W by slot 60U. Antenna 40-3 may at least partially overlap slot 60U, conductive structures 86, and/or conductive support plate 58. Antenna 40-3 may, for example, have an antenna resonating element arm formed from conductive traces on a flexible printed circuit. If desired, portions of segments 76 and/or 66 may also contribute to the frequency response of antenna 40-3.

As shown in FIG. 7, antenna 40-4 may have an antenna resonating element arm (e.g., an inverted-F antenna resonating element arm) formed from segment 66 of peripheral conductive housing structures 12W. Antenna 40-4 may be fed using antenna feed 50-4 (FIG. 6). Antenna feed 50-4 may be coupled across slot 60U. For example, antenna feed 50-4 may have a positive antenna feed terminal 52-4 coupled to segment 66 and may have a ground antenna feed terminal coupled to conductive structures 86 and/or support plate 58 (not shown in FIG. 7 for the sake of clarity). Antenna currents for antenna 40-4 may flow along segment 66, conductive support plate 58, and/or conductive structures 86, for example.

If desired, antenna 40-4 may include one or more return paths coupled between segment 66 and the antenna ground. The return path(s) may include antenna tuning components such as switchable inductors, switchable capacitors, filters, impedance matching circuitry, etc. (not shown in FIG. 7 for the sake of clarity). The antenna tuning components may be used to adjust the frequency response of antenna 40-4 in one or more frequency bands. The frequency response of antenna 40-4 may be determined by one or more lengths of segment 66 (e.g., the length of segment 66 extending from one or both sides of positive antenna feed terminal 52-4 to gaps 18-1 and/or 18-2), one or more harmonic modes of segment 74 and/or slot 60U, and/or the antenna tuning components coupled to segment 66, for example.

Antenna 40-2 may also have an antenna resonating element arm (e.g., an inverted-F antenna resonating element arm) formed from segment 66 of peripheral conductive housing structures 12W. Antenna 40-2 may be fed using antenna feed 50-2 (FIG. 6). Antenna feed 50-2 may be coupled across slot 60U. For example, antenna feed 50-2 may have a positive antenna feed terminal 52-2 coupled to segment 66 and may have a ground antenna feed terminal coupled to conductive support plate 58 and/or conductive structures 86 (not shown in FIG. 7 for the sake of clarity). Antenna currents for antenna 40-2 may flow along segment 66, conductive support plate 58, and/or conductive structures 86, for example. If desired, portions of segment 76 may also contribute to the frequency response of antenna 40-2.

As shown in FIG. 7, slot 60U may include an extended (elongated) portion 88. Extended portion 88 of slot 60U may extend between segment 76 and conductive structures 86 (e.g., segment 76 and conductive structures 86 may define opposing edges of extended portion 88), along a longitudinal axis of device 10 in the -Y direction. Extended portion 88 of slot 60U may have an open end at gap 18-1 and an opposing closed end 102 formed from conductive structures 86, conductive support plate 58, conductive interconnect structures, and/or conductive portions of button 106 on segment 76. Button 106 may be a ringer or volume button for device 10, as examples. Closed end 102 may extend in the -Y direction a non-zero distance such as length 90 from gap 18-1. In other words, extended portion 88 of slot 60U may have an elongated length such as length 90. Extended portion 88 of slot 60U may sometimes be referred to herein simply as slot 88.

In addition, there may be an elongated slot such as slot 104 between segment 76 and conductive display frame 92 that extends from gap 18-1 to conductive interconnect structure 94. Slot 104 may have an elongated length such as length 96 (e.g., measured parallel to the Y-axis). Slot 104 may have opposing edges defined by segment 76 and conductive display frame 92. Slot 104 may be an open slot having an open end at gap 18-1 and an opposing closed end at conductive interconnect structure 94.

If desired, there may also be an elongated slot such as slot 100 in conductive support plate 58. Slot 100 may be an open slot that extends from gap 18-1 or elsewhere along conductive support plate 58 (e.g., a portion of conductive support plate 58 at or overlapping slot 88 or other portions of slot 60U) to an opposing closed end 106. Closed end 106 may be formed from a weld in conductive structures 86 or from other conductive interconnect structures, as examples. Slot 100 may have an elongated length such as length 98 (e.g., measured parallel to the Y-axis). Slot 100 may have opposing edges defined by different portions of conductive support plate 58 or defined by conductive support plate 58 and a lip in segment 76 of peripheral conductive housing structures 12W, for example.

The example of FIG. 7 is merely illustrative. Slots 104, 100, and 88 need not be linear. If desired, slots 104, 100, and/or 88 may follow other paths (e.g., straight paths, meandering paths, curved paths, paths having a combination of different segments of different orientations and shapes, etc.). The edges of slots 104, 100, and 88 may be linear, curved, or may include any desired number of linear or curved segments. In other words, slots 104, 100, and 88 may have other shapes.

Antenna 40-1 may be a distributed slot antenna (e.g., a distributed open slot antenna) having multiple electromagnetically coupled slot antenna resonating elements. The slot antenna resonating elements may be vertically distributed across different heights within device 10 (e.g., as measured parallel to the Z-axis). The slot antenna resonating elements in antenna 40-1 may include slot 88 between segment 76 and conductive structures 86, slot 104 between conductive display frame 92 and segment 76, and slot 100 in conductive support plate 58. Slot 88 may therefore sometimes be referred to herein as slot antenna resonating element 88, slot antenna radiating element 88, radiating slot 88, open slot antenna resonating element 88, open slot element 88, or simply as slot element 88. Slot 100 may sometimes be referred to herein as slot antenna resonating element 100, slot antenna radiating element 100, radiating slot 100, open slot antenna resonating element 100, open slot element 100, or simply as slot element 100. Slot 104 may sometimes be referred to herein as slot antenna resonating element 104, slot antenna radiating element 104, radiating slot 104, open slot antenna resonating element 104, open slot element 104, or simply as slot element 104.

Antenna 40-1 may be fed using antenna feed 50-1. Antenna feed 50-1 may be coupled across slot element 88. For example, antenna feed 50-1 may have a positive antenna feed terminal 52-1 coupled to segment 76 (e.g., at or adjacent gap 18-1) and may have a ground antenna feed terminal 44-1 coupled to conductive structures 86. Antenna feed 50-1 may directly feed slot element 88. Corresponding antenna currents I1 may flow around the perimeter of slot element 88 (e.g., through a portion of segment 76 and conductive structures 86 between positive antenna feed terminal 52-1 and ground antenna feed terminal 44-1). A conductive interconnect structure may electrically couple conductive support plate 58 and conductive display frame 92 to conductive structures 86 at ground antenna feed terminal 44-1 if desired.

In general, the length of the perimeter of slot element 88 and thus length 90 of slot element 88 determines the resonating frequencies of slot element 88 (e.g., where length 90 is approximately equal to one-quarter of the effective wavelength of operation of the antenna). However, length 90 is limited by the presence of conductive structures in button 106, which prevent slot element 88 from extending further in the -Y direction. This may prevent slot element 88 from resonating on its own at relatively low frequencies such as frequencies in the L5 GPS band at 1176 MHz. As an example, length 90 may be approximately $\frac{1}{40}$ times a wavelength corresponding to the L5 GPS band.

To mitigate these issues, slot elements 104 and 100 may contribute to the overall resonance and frequency response of antenna 40-1 to allow antenna 40-1 to resonate at relatively low frequencies such as frequencies in the L5 GPS band. As shown in FIG. 7, in addition to antenna currents I1 around slot element 88, incident radio-frequency signals (e.g., in the L5 GPS band) may produce antenna currents I2 around slot element 104 and antenna currents I3 around slot element 100. Antenna currents I2 may run along segment 76, through conducive interconnect structure 94, and along conductive display frame 92 between positive antenna feed terminal 52-1 and ground antenna feed terminal 44-1. Antenna currents I3 may run along conductive support plate 58 around slot element 100 and through weld 106 (e.g., between positive antenna feed terminal 52-1 and ground antenna feed terminal 44-1). Antenna currents I1, I2, and I3 may be passed to radio-frequency transceiver circuitry 36 (FIG. 6) via antenna feed 50-1 in the frequency band of operation of antenna 40-1 (e.g., in the L5 GPS band). Length 96 of slot element 104, length 98 of slot element 100, and length 90 of slot element 88 may collectively configure antenna 40-1 to resonate at relatively low frequencies such as frequencies in the L5 GPS band despite slot element 88 being too short to support resonance at these frequencies on its own. This may allow antenna 40-1 to cover the L5 GPS band despite the presence of button 106, for example. Slot element 88 may sometimes be referred to herein as the primary slot element of antenna 40-1 whereas slot elements 104 and 100 are sometimes referred to herein as secondary slot elements of antenna 40-1.

Figure 8:
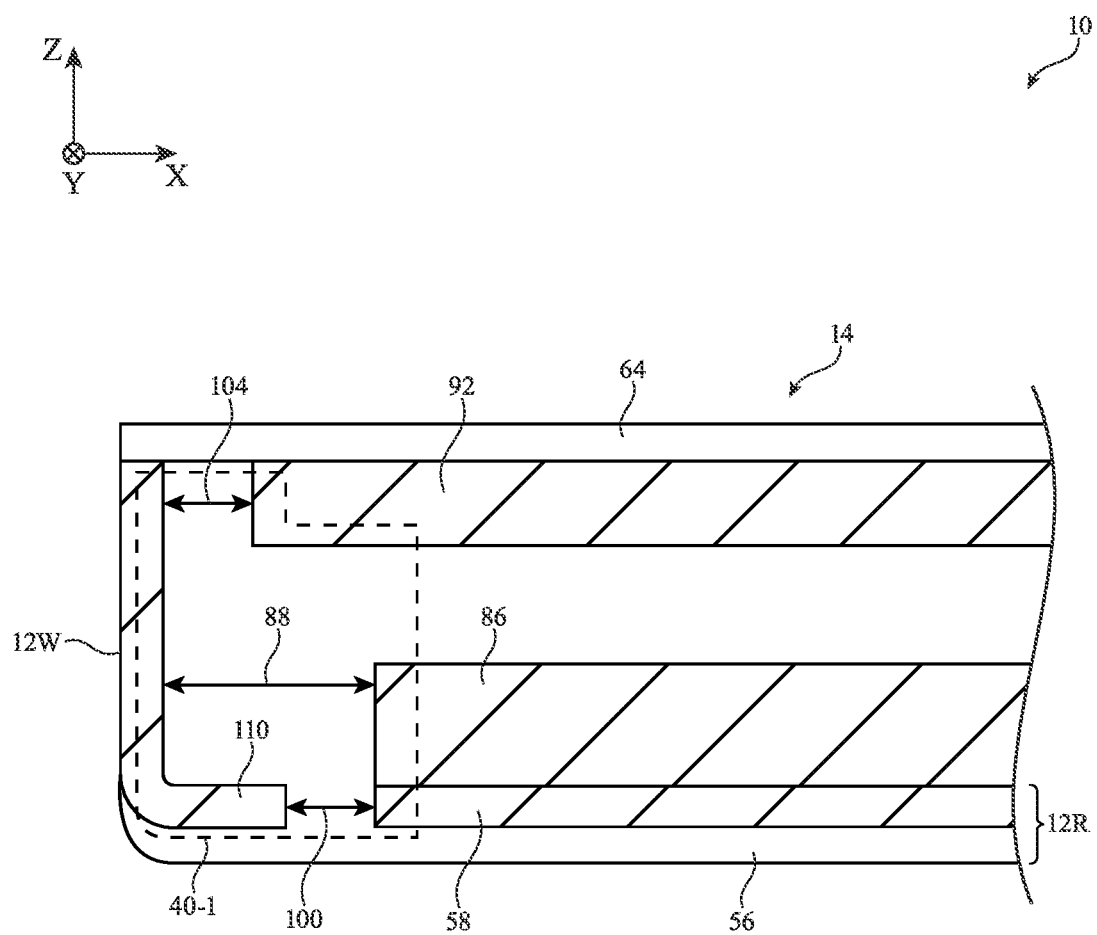
FIG. 8 is a cross-sectional side view of an electronic device having a distributed slot antenna that includes multiple vertically-overlapping slot elements in accordance with some embodiments.

FIG. 8 is a cross-sectional side view of antenna 40-1 (e.g., as taken in the direction of line AA' of FIG. 7) that shows how antenna 40-1 may include a distributed slot antenna resonating element formed from slots elements 100, 88, and 104 that are vertically overlapping (stacked) in device 10.

As shown in FIG. 8, conductive display frame 92 may be laterally separated (e.g., in the X-Y plane) from peripheral conductive housing structures 12W by slot element 104. Display cover layer 64 may overlap conductive display frame 92 and slot element 104. Slot element 104 may be located at a first vertical height within device 10 (e.g., a first distance from display cover layer 64 as measured parallel to the Z-axis).

Conductive structures 86 (e.g., a main logic board for device 10) may be laterally separated from peripheral conductive housing structures 12W by slot element 88. Conductive structures 86 may be mounted to conductive support plate 58 or may be spaced apart from conductive support plate 58. Slot element 88 may be located at a second vertical height within device 10 (e.g., a second distance from display cover layer 64 that is farther from display cover layer 64 than slot element 104).

Slot element 100 may be located between conductive structure 110 and conductive support plate 58. Conductive structure 110 may, for example, be a portion of conductive support plate 58 (e.g., a portion of conductive support plate 58 that is connected to or integral with peripheral conductive housing structures 12W at rear housing wall 12R). Slot element 100 may therefore sometimes be referred to herein as being a slot element in conductive support plate 58 (e.g., a slot element having opposing edges defined by conductive support plate 58 as the slot element runs along its length 98 as shown in FIG. 7). Conductive structure 110 may form an integral and inwardly protruding lip for peripheral conductive housing structures 12W and may therefore sometimes also be referred to herein as a conductive lip 110 of peripheral conductive housing structures 12W. Dielectric cover layer 56 may be mounted to conductive support plate 58 and peripheral conductive housing structures 12W. Conductive lip 110 may help to mount dielectric cover layer 56 to peripheral conductive housing structures 12W (e.g., using a layer of adhesive). Slot element 100 may be located at a third vertical height within device 10 (e.g., a third distance from display cover layer 64 that is farther from display cover layer 64 than slot element 88). Conductive interconnect structures (e.g., vertical conductive interconnect structures) such as conductive pins, conductive springs, solder, welds, conductive foam, conductive adhesive, etc., may couple conductive display frame 92 to conductive structures 86 and may couple conductive structures 86 to conductive support plate 58 at one or more locations along slot elements 104, 88, and/or 100 (e.g., at ground antenna feed terminal 44-1 of FIG. 7).

Slot elements 104, 88, and 100 may be electromagnetically coupled together (intercoupled) (e.g., due to peripheral conductive housing structures 12W forming edges of each of slot elements 104, 88, and 100, due to conductive interconnect structures that vertically couple conductive display frame 92 to conductive structures 86 and conductive support plate 58 at one or more points, and/or due to wireless near-field electromagnetic coupling between the overlapping slots). In this way, antenna 40-1 may be a multi-layer, multi-slot, distributed slot antenna having a resonating element that is collectively formed from slot elements 100, 88, and 104 (e.g., a multi-layer, multi-slot, distributed slot antenna resonating element), whereas the antenna feed 50-1 (FIG. 7) for antenna 40-1 is coupled across one of the slot elements (e.g., slot element 88). Antenna 40-1 may radiate through the front face and/or the rear face of device 10.

The length 90 of slot element 88, the length 96 of slot element 104, and the length 98 of slot element 100 (FIG. 7) may collectively establish the resonating frequencies of antenna 40-1, such that the antenna currents I1 running around the perimeter of slot element 88 (e.g., in the X-Y), antenna currents I2 running around the perimeter of slot element 104, and antenna currents I3 running around the perimeter of slot element 100 collectively resonate in the frequency band of antenna 40-1 (e.g., in the L5 GPS band). Corresponding radio-frequency signals in the frequency band may be passed to radio-frequency transceiver circuitry 36 (FIG. 6) over antenna feed 50-1 (FIG. 7). If desired, antenna 40-1 may also be used to transmit radio-frequency signals in one or more frequency bands.

Figure 9:
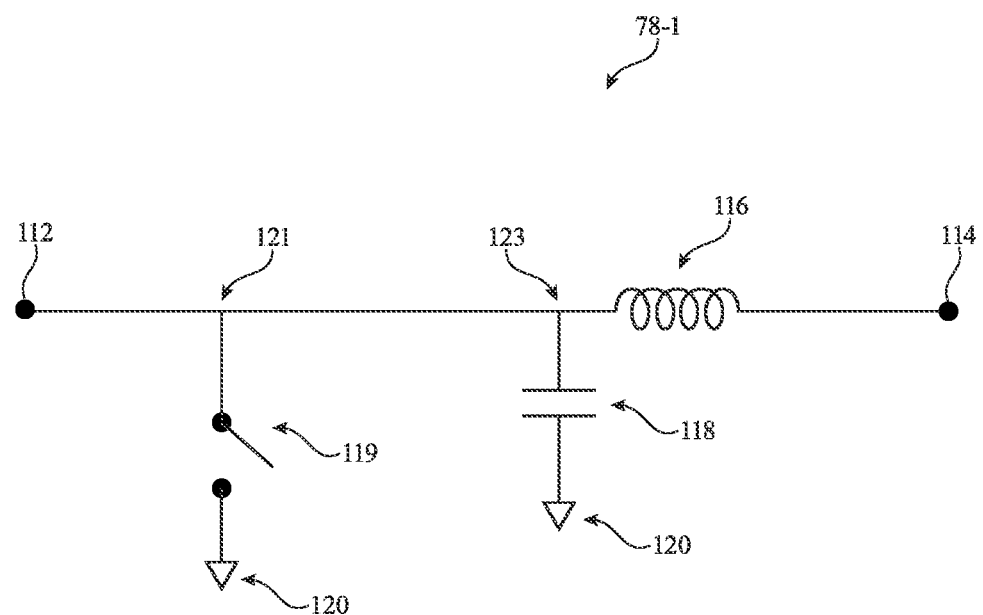
FIG. 9 is a circuit diagram of an illustrative radio-frequency front end circuit that may be coupled to the antenna feed for a distributed slot antenna in accordance with some embodiments.

If desired, antennas 40-1, 40-2, and 40-3 may have respective front-end circuits 78 that help to electromagnetically isolate the antennas from each other despite their close proximity within device 10. FIG. 9 is a circuit diagram of one exemplary front-end circuit 78-1 that may be coupled to positive antenna feed terminal 52-1 of antenna 40-1 (FIG. 7).

As shown in FIG. 9, front-end circuit 78-1 may have a first terminal 112 and a second terminal 114. First terminal 112 may be coupled to positive antenna feed terminal 52-1 on segment 76 of FIG. 7 (e.g., through a conductive feed pad, conductive screw, screw boss, solder, etc.). Second terminal 114 may be coupled to radio-frequency transceiver circuitry 36 through transmission line path 42-1 (FIG. 6). Front-end circuit 78-1 may include an inductor such as inductor 116 coupled in series between terminals 112 and 114. Front-end circuit 78-1 may include a shunt capacitor such as capacitor 118 coupled between antenna ground 120 and a circuit node 123 between terminal 112 and inductor 116.

Capacitor 118 may have a capacitance and inductor 116 may have an inductance that configure front-end circuit 78-1 to perform impedance matching between transmission line path 42-1 and antenna 40-1 at the frequencies of operation of antenna 40-1 (e.g., in the L5 GPS band). Capacitor 118 and inductor 116 may also configure front-end circuit 78-1 to form a low-pass filter that prevents high frequency antenna current on segment 76 (e.g., as produced by antennas 40-2 and/or 40-3) from passing to transmission line path 42-1 and interfering with the operation of antenna 40-1. The capacitance of capacitor 118 may be, for example, 1-5 pF, 3 pF, 2-4 pF, 1-10 pF, or other capacitances. The inductance of inductor 116 may be, for example, 10-30 nH, 20 nH, 5-45 nH, 1-50 nH, or other inductances.

If desired, front-end circuit 78-1 may include a bypass switch such as switch 119. Switch 119 may be coupled between antenna ground 119 and a circuit node 121 between circuit node 123 and terminal 112. Switch 119 may be turned off (open) when antenna 40-1 is active and may be turned on (closed) when antenna 40-1 is inactive. This may help to maximize electromagnetic isolation between antennas 40-1, 40-2, and/or 40-3, for example. The example of FIG. 9 is merely illustrative and, in general, front-end circuit 78-1 may include any desired circuit components coupled together in any desired manner.

Figure 10:
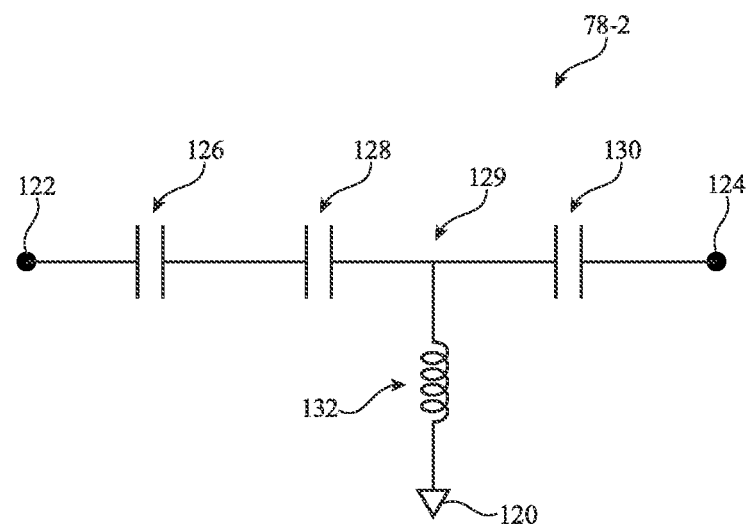
FIGS. 10 and 11 are circuit diagrams of illustrative radio-frequency front end circuits that may be coupled to the antenna feeds for antennas in the vicinity of a distributed slot antenna in accordance with some embodiments.

FIG. 10 is a circuit diagram of one exemplary front-end circuit 78-2 that may be coupled to antenna feed 50-2 of antenna 40-2 (FIG. 6). As shown in FIG. 10, front-end circuit 78-2 may have a first terminal 122 and a second terminal 124. First terminal 122 may be coupled to the positive antenna feed terminal of antenna feed 50-2 (FIG. 6). Second terminal 124 may be coupled to radio-frequency transceiver circuitry 36 through transmission line path 42-2 (FIG. 6). Front-end circuit 78-2 may include capacitors such as capacitors 126, 128, and 130 coupled in series between terminals 122 and 124. Front-end circuit 78-2 may include a shunt inductor such as inductor 132 coupled between circuit node 129 (e.g., between capacitors 128 and 130) and antenna ground 120.

Capacitors 126, 128, and 130 may have capacitances and inductor 132 may have an inductance that configures front-end circuit 78-2 to perform impedance matching between transmission line path 42-2 and antenna 40-2 at the frequencies of operation of antenna 40-2. Capacitors 126-130 and inductor 132 also configure front-end circuit 78-2 to form a high-pass filter that prevents low frequency antenna current on segment 66 (FIG. 7) from passing to transmission line path 42-2 and interfering with the operation of antenna 40-2. The capacitance of capacitor 126 may be 0.2 pF, the capacitance of capacitor 128 may be 0.3 pF, and the capacitance of capacitor 130 may be 2.4 pF, as examples. The example of FIG. 10 is merely illustrative and, in general, front-end circuit 78-2 may include any desired circuit components coupled together in any desired manner.

Figure 11:
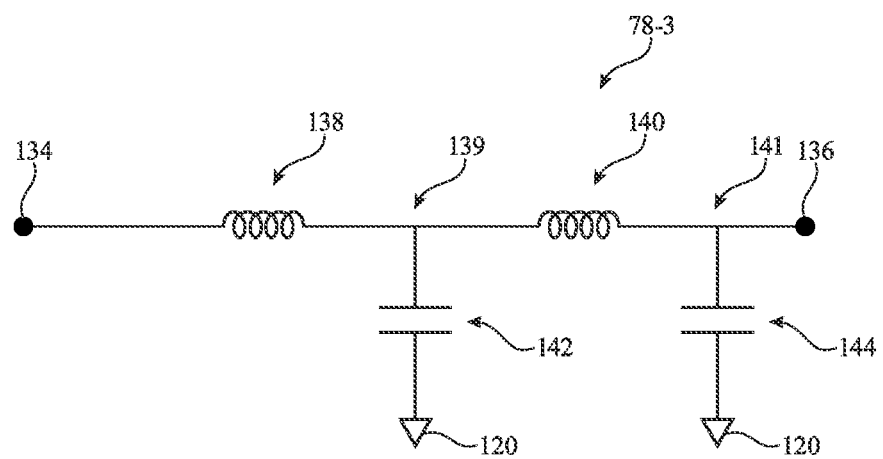

FIG. 11 is a circuit diagram of one exemplary front-end circuit 78-3 that may be coupled to antenna feed 50-3 of antenna 40-3 (FIG. 6). As shown in FIG. 11, front-end circuit 78-3 may have a first terminal 134 and a second terminal 136. First terminal 134 may be coupled to the positive antenna feed terminal of antenna feed 50-3 (FIG. 6). Second terminal 136 may be coupled to radio-frequency transceiver circuitry 36 through transmission line path 42-3 (FIG. 6). Front-end circuit 78-3 may include inductors such as inductors 138 and 140 coupled in series between terminals 134 and 136. Front-end circuit 78-3 may include a first shunt capacitor such as capacitor 142 coupled between circuit node 139 (e.g., between inductors 138 and 140) and antenna ground 120. Front-end circuit 78-3 may also include a second shunt capacitor such as capacitor 144 coupled between circuit node 141 (e.g., between inductor 140 and terminal 136) and antenna ground 120. Capacitors 142 and 144 and inductors 138 and 140 may perform impedance matching for antenna 40-3 at the frequencies of operation of antenna 40-3 (e.g., between 3 GHz and 5 GHz). Capacitors 142 and 144 and inductors 138 and 140 may also form a band stop filter at frequencies over 5 GHz, for example. The example of FIG. 11 is merely illustrative and, in general, front-end circuit 78-3 may include any desired circuit components coupled together in any desired manner.

Figure 12:
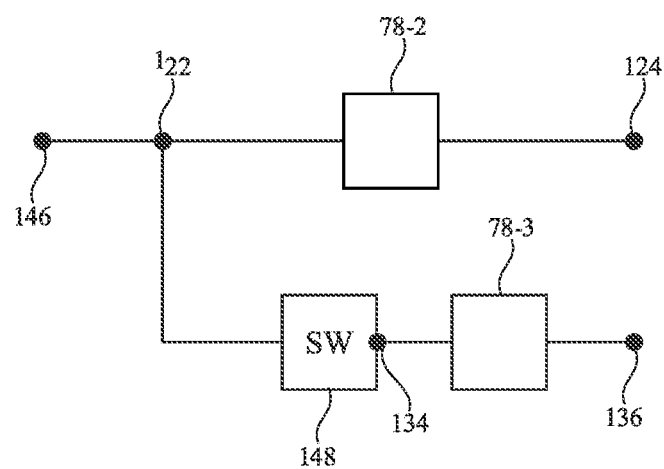
FIG. 12 is a circuit diagram showing how multiple antennas in the vicinity of a distributed slot antenna may share a single antenna feed in accordance with some embodiments.

If desired, antennas 40-2 and 40-3 may share a single antenna feed 50. FIG. 12 is a circuit diagram showing one example of how antennas 40-2 and 40-3 may share a single antenna feed. As shown in FIG. 12, terminal 122 of front-end circuit 78-2 may be coupled to terminal 146. Terminal 146 may be coupled to positive antenna feed terminal 52-2 on segment 66 (FIG. 7). Terminal 124 may be coupled to transmission line path 42-2.

Terminal 134 of front-end circuit 78-3 may be coupled to terminal 122 through a switching circuit such as switch (SW) 148 (e.g., terminal 134 of front-end circuit 78-3 may be coupled to switch 148). Switch 134 may be turned on (closed) when antenna 40-3 is active and may be turned off (open) when antenna 40-3 is inactive. This may help to electromagnetically isolate antennas 40-3 and 40-4. In this example, antenna 40-3 radiates using segment 66 (FIG. 7) rather than using a conductive trace on a flexible printed circuit. The front-end circuitry of FIGS. 9-12 may all be disposed on the same flexible printed circuit if desired.

Figure 13:
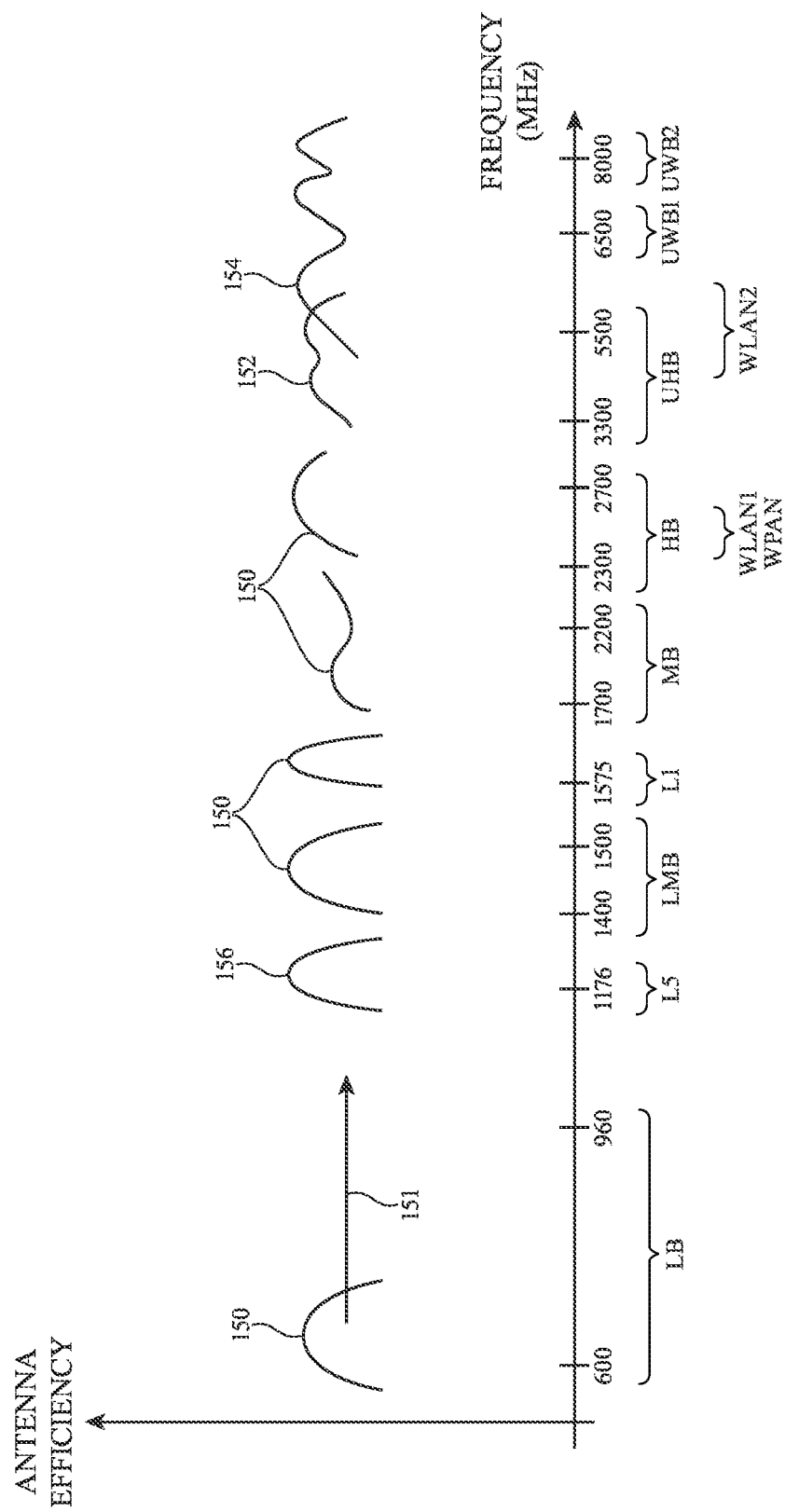
FIG. 13 is a chart of illustrative frequency bands that may be covered by antennas in a corner of an electronic device in accordance with some embodiments.

FIG. 13 is a plot of antenna efficiency as a function of frequency for the antennas in the upper-left corner of device 10 (e.g., antennas 40-1, 40-2, 40-3, and 40-4 of FIG. 7). As shown in FIG. 13, curves 150 plot the frequency response of antenna 40-4. As shown by curves 150, antenna 40-4 may convey radio-frequency signals in the cellular low band (LB) (e.g., around 600-960 MHz), the cellular low-midband (LMB) (e.g., between 1400 and 1500 MHz), the L1 GPS band (e.g., at 1575 MHz), the cellular midband (MB) (e.g., between 1700 and 2200 MHz), the cellular high band (HB) (e.g., between 2300 and 2700 MHz), the 2.4 GHz WLAN band (WLAN1) and WPAN band, and a satellite communications bands such as an S-band around 2483.5-2500 MHz (e.g., for reception of downlink signals from a communications satellite constellation that include downlink data such as message data, voice data, or other application data). Antenna tuning component(s) coupled to segment 66 (FIG. 7) may adjust (tune) the frequency response of antenna 40-4 across the cellular low band as shown by arrow 151. Antenna tuning component(s) coupled to segment 66 (FIG. 7) may also adjust the frequency response of antenna 40-4 within the low-midband and/or the cellular midband.

Curve 156 of FIG. 13 plots the frequency response of antenna 40-1. As shown by curve 156, antenna 40-1 may convey (e.g., receive) radio-frequency signals in the L5 GPS band at 1176 MHz. Distributing the antenna resonating element of antenna 40-1 beyond slot element 88 to also include slot elements 104 and 100 may, for example, serve to reduce the response peak of antenna 40-1 in frequency to that shown by curve 156 despite button 106 (FIG. 7) limiting the overall length of slot element 88.

Curve 152 of FIG. 13 plots the frequency response of antenna 40-3. As shown by curve 152, antenna 40-3 may convey radio-frequency signals in the cellular ultra-high band (UHB) (e.g., between 3300 MHz and 5500 MHz).

Curve 154 of FIG. 13 plots the frequency response of antenna 40-2. As shown by curve 40-2, antenna 40-2 may convey radio-frequency signals in the 5 GHz WLAN band (WLAN2) (e.g., between 5180 MHz and 5800 MHz), a first UWB communications band (UWB1) (e.g., a 6.5 GHz band from 6250 MHz to 6750 MHz), and a second UWB communications band (UWB2) (e.g., an 8.0 GHz band from 7750 MHz to 8250 MHz). In this way, the antennas in the corner of device 10 may concurrently perform wireless communications using each of these frequency bands for device 10.

The example of FIG. 13 is merely illustrative. Curves 150-156 may have other shapes in practice. Antennas 40-1, 40-2, 40-3, and 40-4 may have any desired number of response peaks at any desired frequencies. If desired, antennas 40-5 and 40-6 in the upper-right corner of device 10 (FIG. 6) may also convey radio-frequency signals in one or more of these bands. For example, antenna 40-6 may convey (e.g., receive) radio-frequency signals in the L5 GPS band at 1176 MHz. In these examples, antenna 40-1 may be omitted. In other implementations, antenna 40-6 may be omitted.

At the same time, antenna 40-5 may convey radio-frequency signals in the cellular midband, the cellular high band, the 2.4 GHz WLAN band, the cellular ultra-high band, and a satellite communications band such as an L-band around 1610-1626.5 MHz (e.g., for transmission of uplink signals to a communications satellite constellation that include uplink data such as message data, an emergency message, voice data, or other application data). In this way, antennas 40-4 and 40-5 may collectively perform uplink and downlink communications with a constellation of communications satellites (e.g., to form a bi-directional communications link between device 10 and a satellite ground station or gateway through one or more communications satellites in the constellation of constellation satellites). If desired, device 10 may also include an additional antenna to handle uplink and downlink communications in the satellite communications bands (e.g., for diversity). For example, device 10 may include a seventh antenna 40 in the bottom-right corner of device 10. This seventh antenna may, for example, have an antenna resonating element arm formed from segment 72 of peripheral conductive housing structures 12W (FIG. 5). This seventh antenna may transmit radio-frequency signals in a first satellite communications band such as the L-band around 1610-1626.5 MHz (e.g., for transmission of uplink signals to a communications satellite constellation that include uplink data such as message data, an emergency message, voice data, or other application data) and may receive radio-frequency signals in a second satellite communications band such as the S-band around 2483.5-2500 MHz (e.g., for reception of downlink signals from a communications satellite constellation that include downlink data such as message data, voice data, or other application data). This seventh antenna and antennas 40-4 and 40-5 may collectively provide diversity coverage for both uplink and downlink signals conveyed between device 10 and the satellite constellation, for example. This example is merely illustrative and, if desired, antennas 40-4 and 40-5 may each transmit radio-frequency signals to the satellite constellation and may each receive radio-frequency signals from the satellite constellation in one or more satellite communications bands. Device 10 may also include an eighth antenna 40 in the bottom-left corner of device 10. This eighth antenna may, for example, have an antenna resonating element arm formed from segment 74 of peripheral conductive housing structures 12W (FIG. 5). This eighth antenna may transmit radio-frequency signals to the satellite constellation and may receive radio-frequency signals from the satellite constellation in one or more satellite communications bands (e.g., such that the eighth antenna 40, the seventh antenna 40, antenna 40-4, and antenna 40-5 provide bidirectional satellite communications coverage from the four peripheral corners of device 10).

Figure 14:
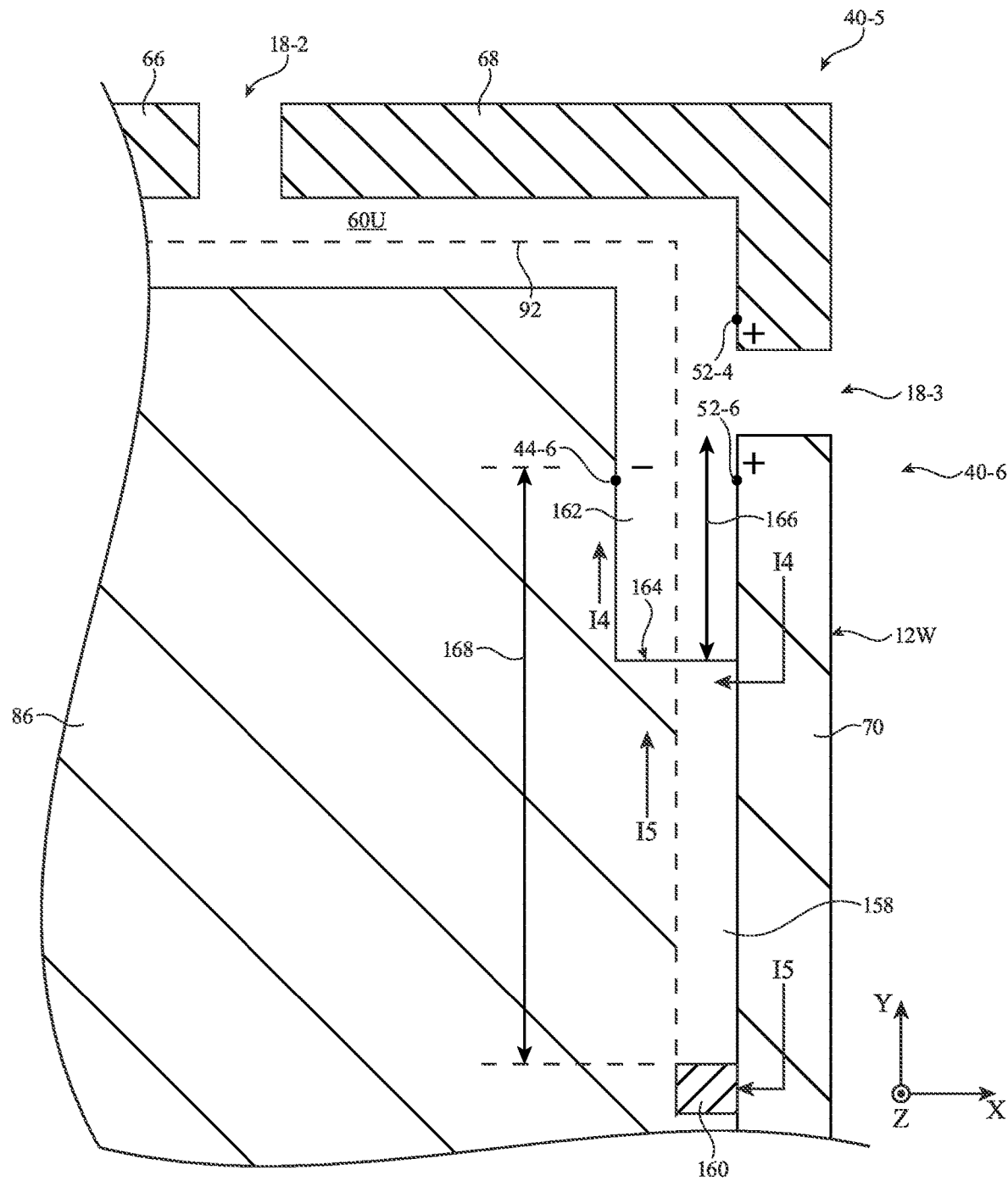
FIG. 14 is a top interior view of a second corner of an illustrative electronic device having multiple antennas including a distributed slot antenna in accordance with some embodiments.

FIG. 14 is a top interior view showing how antennas 40-4 and 40-5 may be formed within device 10 in a manner such that the antennas each cover the corresponding frequency bands with satisfactory antenna efficiency.

As shown in FIG. 14, conductive display frame 92 may vertically overlap (overly) conductive structures 86. Conductive interconnect structures such as conductive interconnect structure 160 may couple the edge of conductive display frame 92 to segment 70 of peripheral conductive housing structures 12W. Conductive interconnect structure 160 may include conductive adhesive, conductive springs, welds, solder, a conductive clip, a conductive snap, conductive foam, a conductive screw, a conductive screw boss, a conductive pin, and/or any other desired conductive interconnect structures. Conductive interconnect structure 160 may serve to secure, attach, affix, or mount display 14 to peripheral conductive housing structures 12W and may, if desired, ground conductive display frame 92 to peripheral conductive housing structures 12W. Conductive interconnect structures such as conductive interconnect structure 160 and/or other grounding structures may electrically couple conductive structures 86, conductive support plate 58 (not shown in FIG. 14 for the sake of clarity), and conductive display frame 92 together (e.g., to hold conductive structures 86, the conductive support plate, and conductive display frame 92 at a common ground or reference potential). Conductive structures 86, the conductive support plate, and conductive display frame 92 may, for example, form the antenna ground for antennas 40-5 and 40-6.

Conductive structures 86 and the conductive support plate may be separated from segments 66 and 68 of peripheral conductive housing structures 12W by slot 60U. As shown in FIG. 14, antenna 40-5 may have an antenna resonating element arm (e.g., an inverted-F antenna resonating element arm) formed from segment 68 of peripheral conductive housing structures 12W. Antenna 40-5 may be fed using antenna feed 50-5 (FIG. 6). Antenna feed 50-5 may be coupled across slot 60U. For example, antenna feed 50-5 may have a positive antenna feed terminal 52-5 coupled to segment 68 and may have a ground antenna feed terminal coupled to conductive structures 86 and/or the conductive support plate (not shown in FIG. 14 for the sake of clarity). Antenna currents for antenna 40-5 may flow along segment 68, conductive structures 86, and/or the conductive support plate, for example. Antenna currents on segment 70 may also contribute to the response of antenna 40-5.

If desired, antenna 40-5 may include one or more return paths coupled between segment 66 and the antenna ground. The return paths may include antenna tuning components such as switchable inductors, switchable capacitors, filters, impedance matching circuitry, etc. (not shown in FIG. 14 for the sake of clarity). The antenna tuning components may be used to adjust the frequency response of antenna 40-5 in one or more frequency bands.

As shown in FIG. 14, slot 60U may include an extended (elongated) portion 162. Extended portion 162 of slot 60U may extend between segment 70 and conductive structures 86 (e.g., segment 70 and conductive structures 86 may define opposing edges of extended portion 162), along a longitudinal axis of device 10 in the -Y direction. Extended portion 162 of slot 60U may have an open end at gap 18-3 and an opposing closed end 164 formed from conductive structures 86, conductive interconnect structures, etc. Closed end 164 may extend a non-zero distance such as length 166 from gap 18-3 in the -Y direction. In other words, extended portion 162 of slot 60U may have an elongated length such as length 166. Extended portion 162 of slot 60U may sometimes be referred to herein simply as slot 162.

In addition, there may be an elongated slot such as slot 158 between segment 70 and conductive display frame 92 that extends from gap 18-3 to conductive interconnect structure 160. Slot 158 may have an elongated length such as length 168 (e.g., measured parallel to the Y-axis). Slot 158 may have opposing edges defined by segment 70 and conductive display frame 92. Slot 158 may be an open slot having an open end at gap 18-3 and an opposing closed end at conductive interconnect structure 160. Slot 158 may at least partially overlap (overly) slot 164 in the vertical direction.

The example of FIG. 14 is merely illustrative. Slots 162 and 158 need not be linear. If desired, slots 162 and 158 may follow other paths (e.g., straight paths, meandering paths, curved paths, paths having a combination of different segments of different orientations and shapes, etc.). The edges of slots 162 and 158 may be linear, curved, or may include any desired number of linear or curved segments. In other words, slots 162 and 158 may have other shapes.

Antenna 40-6 may be a distributed slot antenna (e.g., a distributed open slot antenna) having multiple slot antenna resonating elements. The slot antenna resonating elements may be vertically distributed across different heights within device 10 (e.g., as measured parallel to the Z-axis). The slot antenna resonating elements in antenna 40-6 may include slot 162 between segment 76 and conductive structures 86 and slot 158 between conductive display frame 92 and segment 70. Slot 162 may therefore sometimes be referred to herein as slot antenna resonating element 162, slot antenna radiating element 162, radiating slot 162, open slot antenna resonating element 162, open slot element 162, or simply as slot element 162. Slot 158 may sometimes be referred to herein as slot antenna resonating element 158, slot antenna radiating element 158, radiating slot 158, open slot antenna resonating element 158, open slot element 158, or simply as slot element 158.

Antenna 40-6 may be fed using antenna feed 50-6 (FIG. 6). Antenna feed 50-6 may be coupled across slot element 162. For example, antenna feed 50-6 may have a positive antenna feed terminal 52-6 coupled to segment 70 (e.g., at or adjacent gap 18-3) and may have a ground antenna feed terminal 44-6 coupled to conductive structures 86. Antenna feed 50-6 may directly feed slot element 162. Corresponding antenna currents I4 may flow around the perimeter of slot element 162 (e.g., through a portion of segment 70 and conductive structures 86 between positive antenna feed terminal 52-6 and ground antenna feed terminal 44-6). A conductive interconnect structure may electrically couple the conductive support plate and conductive display frame 92 to conductive structures 86 at ground antenna feed terminal 44-6 if desired.

Slot elements 162 and 158 may collectively contribute to the overall resonance and frequency response of antenna 40-6 to allow antenna 40-6 to resonate at relatively low frequencies such as frequencies in the L5 GPS band. As shown in FIG. 14, in addition to antenna currents I4 around slot element 162, incident radio-frequency signals (e.g., in the L5 GPS band) may produce antenna currents I5 around slot element 158. Antenna currents I5 may run along segment 70, through conducive interconnect structure 160, and along conductive display frame 92 between positive antenna feed terminal 52-6 and ground antenna feed terminal 44-6. Antenna currents I4 and I5 may be passed to radio-frequency transceiver circuitry 36 (FIG. 6) via antenna feed 50-6 in the frequency band of operation of antenna 40-6 (e.g., in the L5 GPS band). Length 166 of slot element 162 and length 168 of slot element 158 may collectively configure antenna 40-1 to resonate at relatively low frequencies such as frequencies in the L5 GPS band despite slot element 162 being too short to support resonance at these frequencies on its own. Slot element 162 may sometimes be referred to herein as the primary slot element of antenna 40-6 whereas slot element 158 is sometimes referred to herein as a secondary slot element of antenna 40-6.

Figure 15:
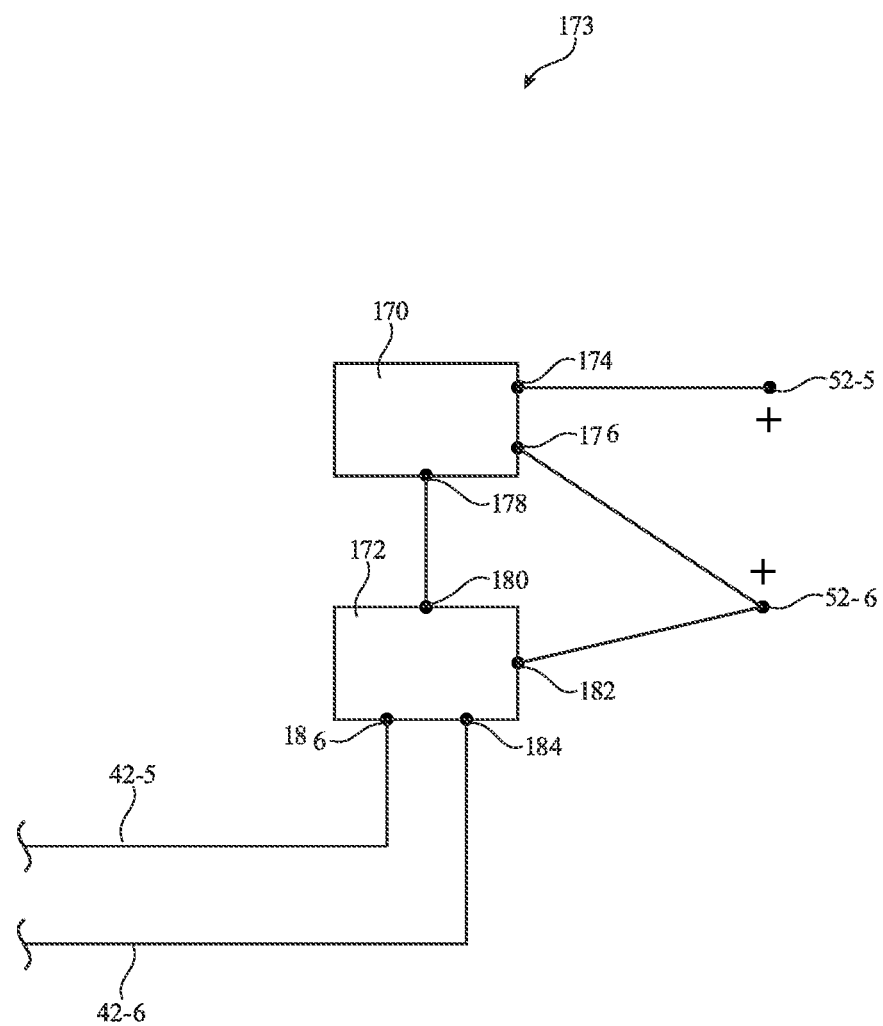
FIG. 15 is a diagram of an illustrative radio-frequency front end circuit that may be coupled to the antenna feeds for multiple antennas including a distributed slot antenna in accordance with some embodiments.

If desired, positive antenna feed terminal 52-6 may also be used to feed radio-frequency signals for antenna 40-5 (e.g., antenna 40-5 may have two positive antenna feed terminals coupled to peripheral conductive housing structures 12W at opposing sides of gap 18-3). FIG. 15 is a diagram of illustrative radio-frequency front-end circuitry for antennas 40-5 and 40-6 in implementations where antennas 40-5 and 40-6 share positive antenna feed terminal 52-6.

As shown in FIG. 15, radio-frequency front-end circuitry 173 may include a first switching circuit 170 and a second switching circuit 172. Switching circuits 170 and 172 may collectively form front-end circuits 78-5 and 78-6 for antennas 40-5 and 40-6 (FIG. 6). Switching circuits 170 and 172 may couple transmission line path 78-5 and transmission line path 78-6 to positive antenna feed terminal 52-5 (on segment 68 of FIG. 14) and positive antenna feed terminal 52-6 (on segment 70 of FIG. 14).

As shown in FIG. 15, switching circuit 172 may have a first terminal (port) 186, a second terminal 184, a third terminal 182, and a fourth terminal 180. Switching circuit 170 may have a first terminal (port) 178, a second terminal 176, and a third terminal 174. Terminal 186 on switching circuit 172 may be coupled to transmission line path 42-5. Terminal 184 on switching circuit 172 may be coupled to transmission line path 42-6. Terminal 182 on switching circuit 172 may be coupled to positive antenna feed terminal 52-6. Terminal 180 on switching circuit 172 may be coupled to terminal 178 on switching circuit 170. Terminal 176 on switching circuit 170 may be coupled to positive antenna feed terminal 52-6. Terminal 174 of switching circuit 170 may be coupled to positive antenna feed terminal 52-5. Front-end circuitry 173 of FIG. 15 may, for example, be disposed on a common/shared flexible printed circuit.

Switching circuit 172 may include, for example, a radio-frequency switch such as a single-pole three-throw (SP3T) switch that includes a series switch (e.g., a field-effect transistor (FET)) that selectively connects or disconnects transmission line path 42-6 from the antenna feed for antenna 40-6, a switchable shunt capacitor (e.g., a capacitor in series with a respective FET) that performs impedance matching for antenna 40-5, and a switchable series inductor (e.g., an inductor in series with a respective FET) that performs impedance matching for antenna 40-5.

Switching circuit 170 may include, for example, a radio-frequency switch such as a single-pole four-throw (SP4T) switch that includes two switchable shunt inductors coupled across slot element 162 (FIG. 6) (e.g., parallel inductors in series with corresponding FETS) from positive antenna feed terminal 52-5 to the antenna ground and two switchable series capacitors (e.g., capacitors in series with respective FETS) coupled across gap 18-3 (FIG. 14) between positive antenna feed terminal 52-5 and positive antenna feed terminal 52-6 (e.g., between terminals 174 and 176).

Control circuitry 38 (FIG. 2) may adjust switching circuits 170 and 172 to tune the frequency response of antennas 40-5 and 40-6 to cover different frequency bands of interest as needed while also electromagnetically isolating the antennas from each other. For example, front-end circuitry 173 may tune antenna 40-5 by shunting the inductors in switching circuit 170 to ground, allowing for a change in the electrical length of the slot in antenna 40-5. This may be used to tune the frequency response of antenna 40-5 across the cellular midband, the cellular high band, the cellular ultra-high band, and the satellite communications band handled by antenna 40-5. The series capacitors in switching circuit 172 may be used to fine-tune the frequency response of antenna 40-5 within the cellular midband, the cellular high band, the cellular ultra-high band, and the satellite communications band handled by antenna 40-5, as well as to boost midband/high band antenna efficiency. In addition, the series capacitors may be used to fine-tune the resonant frequency of antenna 40-6 (e.g., in the L5 GPS band).

Switching circuit 172 may be used to selectively activate (turn on) antenna 40-6 for receiving radio-frequency signals (e.g., in the L5 GPS band). Switching circuit 172 may be used to eliminate lossy modes that occur when antenna 40-6 is inactive (e.g., when the feed FET for antenna 40-6 is turned off), which may optimize performance of antenna 40-5 in the cellular ultra-high band, for example. Turning off the FET for the series inductor in switching circuit 172 may be used to optimize performance of antenna 40-5 in the satellite communications band with improved narrowband matching. When antenna 40-6 is active (connected), this inductor can also be used to optimize the 2.4 GHz WLAN/WPAN response of antenna 40-4. Turning on the FET for the shunt capacitor in switching circuit 172 may serve as an additional tuning knob that can be used to optimize matching in the cellular high band for antenna 40-5. The example of FIG. 15 is merely illustrative and, in general, front-end circuitry 173 may include any desired circuit components coupled together in any desired manner for optimizing the performance of antennas 40-5 and 40-6.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
   peripheral conductive housing structures;
   a display having a display cover layer mounted to the peripheral conductive housing structures; and
   an antenna comprising:
      a first slot element in a first plane at a first distance from the display cover layer and having a first edge defined by a segment of the peripheral conductive housing structures, wherein the first slot element has a first length,
      an antenna feed coupled across the first slot element, and
      a second slot element in a second plane at a second distance from the display cover layer and having a second edge defined by the segment, wherein the first distance is different from the second distance, the second plane is different from the first plane, the second slot element has a second length that is greater than the first length, and the first and second slot elements are configured to collectively convey radio-frequency signals in a frequency band for the antenna.

2. The electronic device of claim 1, the antenna further comprising:
   a third slot element at a third distance from the display cover layer and having a third edge defined by the segment, wherein the third slot element has a third length, the third length is longer than the first length, the first distance is greater than the second distance and less than the third distance, and the first, second, and third slot elements are configured to collectively convey radio-frequency signals in the frequency band.

3. The electronic device of claim 2, wherein the second and third slot elements each at least partially overlaps the first slot element.

4. The electronic device of claim 2, wherein the display comprises a display module configured to emit light through the display cover layer, the display module comprising:
   conductive display structures that define a fourth edge of the second slot element, the fourth edge being opposite the second edge.

5. The electronic device of claim 4, further comprising:
   a gap in the peripheral conductive housing structures, wherein the first slot element has an open end at the gap and the second slot element has an open end at the gap; and
   a conductive interconnect structure that couples the conductive display structures to the segment and that forms a closed end of the second slot element opposite the open end of the second slot element.

6. The electronic device of claim 5, further comprising:
   a rear housing wall mounted to the peripheral conductive housing structures opposite the display cover layer, wherein the rear housing wall comprises a conductive support plate and a dielectric cover layer layered onto the conductive support plate, the conductive support plate defining a fifth edge of the third slot element, the fifth edge being opposite the third edge.

7. The electronic device of claim 6, further comprising:
   a logic board having conductive structures that define a sixth edge of the first slot element, the sixth edge being opposite the first edge.

8. The electronic device of claim 1, wherein the second distance is less than the first distance and the electronic device further comprises:
   a logic board having conductive structures defining a third edge of the first slot element, the third edge being opposite the first edge, wherein the display comprises a display module configured to emit light through the display cover layer, and the display module comprises conductive display structures that define a fourth edge of the second slot element, the fourth edge being opposite the second edge.

9. The electronic device of claim 8, further comprising a conductive interconnect structure that attaches the display module to the segment, wherein the conductive interconnect structure defines a closed end of the second slot element.

10. The electronic device of claim 1, wherein the second distance is greater than the first distance and the electronic device further comprises:
    a logic board having conductive structures defining a third edge of the first slot element, the third edge being opposite the first edge; and
    a rear housing wall mounted to the peripheral conductive housing structures opposite the display cover layer, wherein the rear housing wall comprises a conductive support plate and a dielectric cover layer layered onto the conductive support plate, the conductive support plate defining a fourth edge of the second slot element, the fourth edge being opposite the second edge.

11. The electronic device of claim 1, wherein the frequency band comprises an L5 Global Positioning System (GPS) band.

12. The electronic device of claim 11, further comprising:
    transceiver circuitry; and
    a low pass filter coupled between the transceiver circuitry and the antenna feed.

13. The electronic device of claim 12, further comprising:
    a bypass switch that couples the antenna feed to an antenna ground.

14. The electronic device of claim 1, wherein the first length is perpendicular to the first distance, the second length being perpendicular to the second distance.

15. The electronic device of claim 1, wherein the second distance is greater than the first distance, the first slot element having a third edge defined by a conductive trace on a logic board in the electronic device.

16. The electronic device of claim 15, wherein the second slot element has a fourth edge defined by a conductive support plate for the electronic device.

17. An electronic device comprising:
conductive structures;
peripheral conductive housing structures that run around the conductive structures, wherein the conductive structures are separated from a segment of the peripheral conductive housing structures by a first slot element;
an antenna feed coupled across the first slot element; and
a display mounted to the peripheral conductive housing structures and having a display frame separated from the segment of the peripheral conductive housing structures by a second slot element, wherein the second slot element at least partially overlaps the first slot element and is longer than the first slot element, the first and second slot elements are configured to collectively convey radio-frequency signals in a frequency band, and the conductive structures comprise a conductive structure selected from the group consisting of: a support plate for the electronic device and conductive traces on the main logic board.

18. The electronic device of claim 17, wherein the first slot element is in a first plane separated from a lateral surface of the display by a first distance, the second slot element being in a second plane separated from the lateral surface by a second distance different than the first distance.

19. An electronic device comprising:
conductive structures;
peripheral conductive housing structures that run around the conductive structures, wherein the conductive structures are separated from a segment of the peripheral conductive housing structures by a first slot element;
an antenna feed coupled across the first slot element;
a display mounted to the peripheral conductive housing structures and having a display frame separated from the segment of the peripheral conductive housing structures by a second slot element, wherein the second slot element at least partially overlaps the first slot element and is longer than the first slot element, the first and second slot elements are configured to collectively convey radio-frequency signals in a frequency band, and the peripheral conductive housing structures include an additional segment separated from the segment by a dielectric gap; and
an additional antenna feed coupled to the additional segment and configured to use the additional segment to convey radio-frequency signals in an additional frequency band.

20. The electronic device of claim 19, further comprising:
a first transmission line path configured to convey the radio-frequency signals in the frequency band;
a second transmission line path configured to convey the radio-frequency signals in the additional frequency band;
a single-pole four-throw (SP4T) switch; and
a single-pole three-throw (SP3T) switch, wherein the SP4T switch has a first terminal coupled to the additional antenna feed, a second terminal coupled to the antenna feed, and a third terminal coupled to the SP3T switch, and the SP3T switch has a first terminal coupled to the first transmission line path, a second terminal coupled to the second transmission line path, a third terminal coupled to the antenna feed, and a fourth terminal coupled to the SP4T switch.

* * * * *